(12) United States Patent
Tomeh et al.

(10) Patent No.: US 10,838,505 B2
(45) Date of Patent: Nov. 17, 2020

(54) SYSTEM AND METHOD FOR GESTURE RECOGNITION

(71) Applicant: QUALCOMM Incorporated, San Diego, CA (US)

(72) Inventors: Mahmoud Munes Tomeh, Sunol, CA (US); Edwin Chongwoo Park, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 131 days.

(21) Appl. No.: 15/687,430

(22) Filed: Aug. 25, 2017

(65) Prior Publication Data

US 2019/0064929 A1    Feb. 28, 2019

(51) Int. Cl.
| | | |
|---|---|---|
| *G06F 3/01* | (2006.01) | |
| *G06K 9/00* | (2006.01) | |
| *H04L 29/08* | (2006.01) | |
| *H04W 4/70* | (2018.01) | |
| *H04L 12/28* | (2006.01) | |
| *G06F 3/03* | (2006.01) | |

(Continued)

(52) U.S. Cl.
CPC .............. *G06F 3/017* (2013.01); *G06F 3/011* (2013.01); *G06F 3/0304* (2013.01); *G06K 9/00335* (2013.01); *H04L 12/2803* (2013.01); *H04L 67/10* (2013.01); *H04L 67/16* (2013.01); *H04L 67/22* (2013.01); *H04W 4/70* (2018.02); *G06K 9/00228* (2013.01); *G06K 9/6267* (2013.01); *G06N 7/005* (2013.01)

(58) Field of Classification Search
CPC ...... G06K 9/62; G06K 9/6262; G06K 9/6253; G06K 9/00335; G06K 9/00369; G06K 9/2081; G06K 9/00221; G06K 9/00268; G06F 3/011; G06F 3/017; G06F 3/01; G06F 3/0304; G06T 19/006; G06T 2207/20081; G06T 7/97; G05B 13/0265; G05B 15/02; G05B 23/0289; H05B 47/105; H05B 47/11; H05B 47/10; H05B 45/10; H05B 45/20; H05B 45/11; H04W 4/70; H04W 4/30; G06N 20/00; G06N 3/08

See application file for complete search history.

(56) References Cited

U.S. PATENT DOCUMENTS 8,687,848 B2 *  4/2014  Bran ................. G06K 9/00355
                                                   382/103
9,208,676 B2 * 12/2015  Fadell .................... H05B 47/10
(Continued)

FOREIGN PATENT DOCUMENTS

WO       2016094807 A1    6/2016

OTHER PUBLICATIONS

International Search Report and Written Opinion—PCT/US2018/040744—ISA/EPO—dated Oct. 10, 2018.

*Primary Examiner* — Dismery Mercedes
(74) *Attorney, Agent, or Firm* — MG-IP Law, P.C.

(57) ABSTRACT

Internet of Things (IoT) systems and related methods are disclosed. A method comprises determining whether a first condition holds, the first condition being a condition of the IoT system, performing a function of the IoT system in response to a trigger, wherein the trigger is a determination that the first condition holds, recognizing a gesture based on image data received from an image sensor, and reconfiguring the IoT system for a future performance of the function based on the user feedback data.

20 Claims, 9 Drawing Sheets

(51) Int. Cl.
    *G06K 9/62*          (2006.01)
    *G06N 7/00*         (2006.01)

(56) References Cited

U.S. PATENT DOCUMENTS

| | | |
|---|---|---|
| 9,414,115 B1 | 8/2016 | Mao et al. |
| 9,821,470 B2* | 11/2017 | Laurent .................. B25J 13/006 |
| 10,278,268 B2* | 4/2019 | Casey .................. G06K 9/2081 |
| 10,496,879 B2* | 12/2019 | Park .................. G06K 9/00355 |
| 2010/0162177 A1* | 6/2010 | Eves ........................ G06F 3/017 |
| | | 715/863 |
| 2011/0055846 A1* | 3/2011 | Perez ..................... G06F 3/017 |
| | | 719/313 |
| 2013/0080898 A1 | 3/2013 | Lavian et al. |
| 2013/0170699 A1* | 7/2013 | Bran ....................... G06F 3/017 |
| | | 382/103 |
| 2013/0329946 A1* | 12/2013 | Archibald .......... G06K 9/00335 |
| | | 382/103 |
| 2014/0101137 A1 | 4/2014 | Satyanarayanan |
| 2015/0088283 A1* | 3/2015 | Fiedler .................. H04L 12/282 |
| | | 700/83 |
| 2015/0261318 A1* | 9/2015 | Scavezze ............. G06F 3/0346 |
| | | 345/158 |
| 2016/0007290 A1* | 1/2016 | Lindemann ........... H04M 19/04 |
| | | 370/311 |
| 2016/0187992 A1* | 6/2016 | Yamamoto ......... G06K 9/00389 |
| | | 345/156 |
| 2016/0240060 A1* | 8/2016 | Wang .................. H04L 12/6418 |
| 2017/0064211 A1 | 3/2017 | Omid-Zohoor |
| 2017/0289337 A1* | 10/2017 | Wang ..................... G06F 17/242 |
| 2018/0137858 A1* | 5/2018 | Saxena .................... G10L 15/30 |
| 2019/0073601 A1* | 3/2019 | Alkan .................... G06Q 30/00 |
| 2020/0114931 A1* | 4/2020 | Rao .................... G06K 9/00892 |

\* cited by examiner

SYSTEM AND METHOD FOR GESTURE RECOGNITION

BACKGROUND

Aspects of this disclosure relate generally to telecommunications, and more particularly to interactions between user equipment and other devices in a shared wireless access environment.

The Internet is a global system of interconnected computers and computer networks that use a standard Internet protocol suite (e.g., the Transmission Control Protocol (TCP) and Internet Protocol (IP)) to communicate with each other. The Internet of Things (IoT), sometimes referred to as the Internet of Everything (IoE), is based on the idea that everyday objects, not just computers and computer networks, can be readable, recognizable, locatable, addressable, and controllable via an IoT communications network (e.g., an ad-hoc system or the Internet).

A number of market trends are driving development of IoT devices. For example, increasing energy costs are driving governments' strategic investments in smart grids and support for future consumption, such as for electric vehicles and public charging stations. Increasing health care costs and aging populations are driving development for remote/connected health care and fitness services, wherein doctors can, for example, remotely monitor patients' health while people can track the progress of fitness routines. A technological revolution in the home is driving development for new "smart" services, wherein smart homes and buildings can have centralized control over virtually any device or system in the home or office, from appliances to plug-in electric vehicle (PEV) security systems. Buildings are getting smarter and more convenient as a means to reduce operational costs for enterprise facilities. In the field of asset tracking, enterprises, hospitals, factories, and other large organizations can accurately track the locations of high-value equipment, patients, vehicles, and so on.

As such, in the near future, increasing development in IoT systems will lead to numerous IoT devices surrounding a user at home, in vehicles, at work, and many other locations. Accordingly, a need exists for an IoT management device that leverages large amounts of disorganized data in useful ways.

SUMMARY

The following summary is an overview provided solely to aid in the description of various aspects of the disclosure and is provided solely for illustration of the aspects and not limitation thereof.

In one example, a method performed in an Internet of Things (IoT) system is disclosed. The method may include, for example, determining whether a first condition holds, the first condition being a condition of the IoT system, performing a function of the IoT system in response to a trigger, wherein the trigger is a determination that the first condition holds, recognizing a gesture based on image data received from an image sensor, interpreting the recognized gesture to generate user feedback data, and reconfiguring the IoT system for a future performance of the function based on the user feedback data.

In another example, an IoT system is disclosed. The IoT system may include, for example, a memory system configured to store data and/or instructions, and a processing system coupled to the memory system. The processing system may be configured to determine whether a first condition holds, the first condition being a condition of the IoT system, perform a function of the IoT system in response to a trigger, wherein the trigger is a determination that the first condition holds, recognize a gesture based on image data received from an image sensor, interpret the recognized gesture to generate user feedback data, and reconfigure the IoT system for a future performance of the function based on the user feedback data.

In yet another example, another IoT system is disclosed. The IoT system may include, for example, means for determining whether a first condition holds, the first condition being a condition of the IoT system, means for performing a function of the IoT system in response to a trigger, wherein the trigger is a determination that the first condition holds, means for recognizing a gesture based on image data received from an image sensor, means for interpreting the recognized gesture to generate user feedback data, and means for reconfiguring the IoT system for a future performance of the function based on the user feedback data.

In yet another example, a non-transitory computer-readable medium comprising code is disclosed. When executed by a processor, the code may cause the processor to perform operations in an Internet of Things (IoT) system. The non-transitory computer-readable medium may comprise, for example, code for determining whether a first condition holds, the first condition being a condition of the IoT system, code for performing a function of the IoT system in response to a trigger, wherein the trigger is a determination that the first condition holds, code for recognizing a gesture based on image data received from an image sensor, code for interpreting the recognized gesture to generate user feedback data, and code for reconfiguring the IoT system for a future performance of the function based on the user feedback data.

BRIEF DESCRIPTION OF THE DRAWINGS

A more complete appreciation of aspects of the disclosure and many of the attendant advantages thereof will be readily obtained as the same becomes better understood by reference to the following detailed description when considered in connection with the accompanying drawings which are presented solely for illustration and not limitation of the disclosure, and in which.

DETAILED DESCRIPTION

An IoT system within, for example, a smart home, may be pre-programmed to perform one or more IoT functions using one or more IoT devices. Each performance of an IoT function may be triggered, as per the programming, by one or more contextual conditions identified by the IoT system. The contextual conditions may be identified using data downloaded from a network and/or data sensed directly using an IoT sensor associated with the IoT system. The IoT system may misbehave by, for example, performing a function that a user of the IoT system disapproves of, performing the function at a wrong time, performing the function in response to the wrong set of contextual conditions, etc.

It may be useful to incorporate into the IoT system some algorithm for training and/or reconfiguring the IoT system. The IoT system may learn, based on feedback from a user, whether the user approves or disapproves of the particular function performed by the IoT system. Accordingly, it may be useful to provide many different mechanisms for providing feedback.

Figure 1:
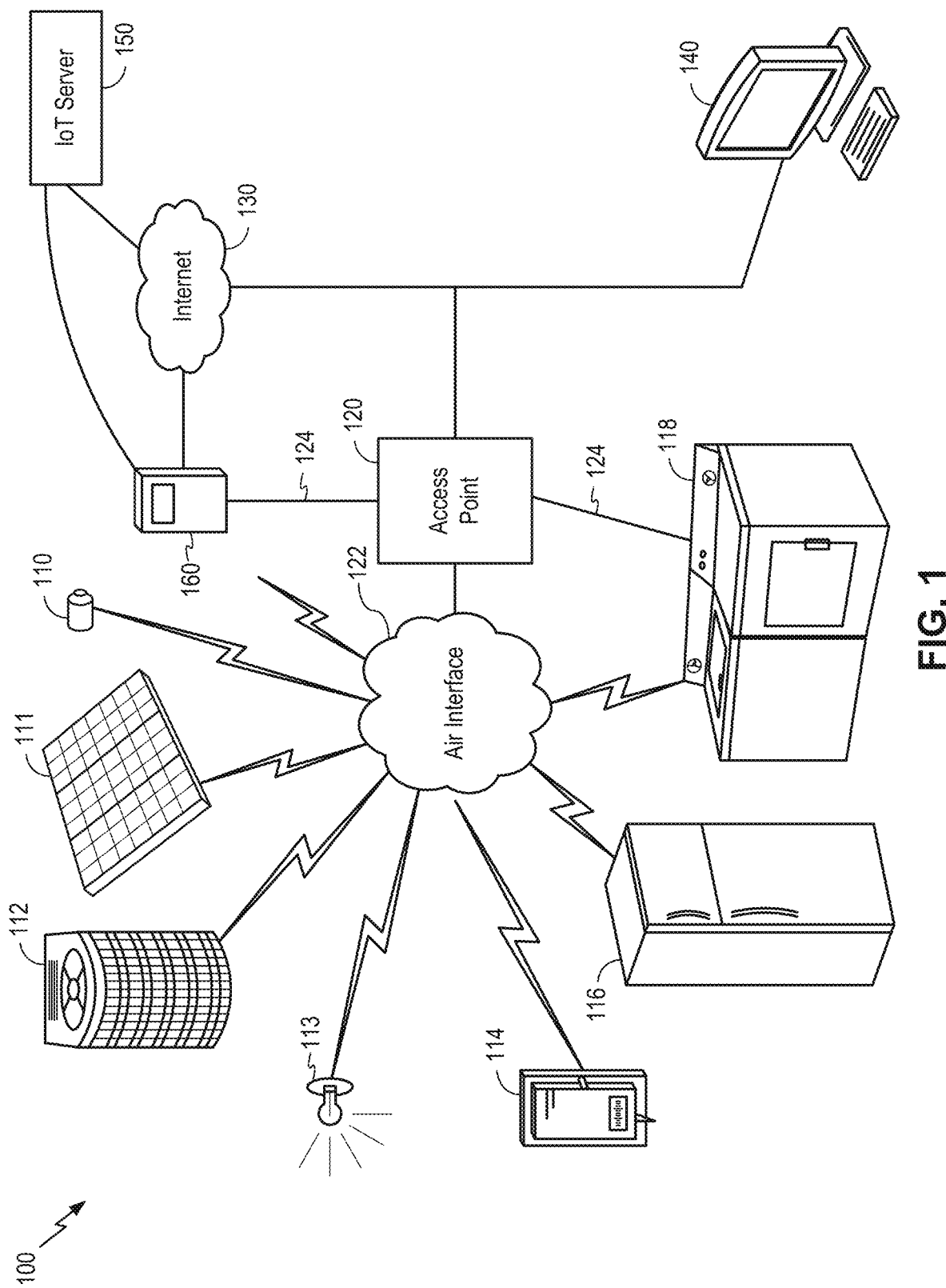
FIG. 1 illustrates a high-level system architecture of a wireless communications system in accordance with an aspect of the disclosure.
Figure 2:
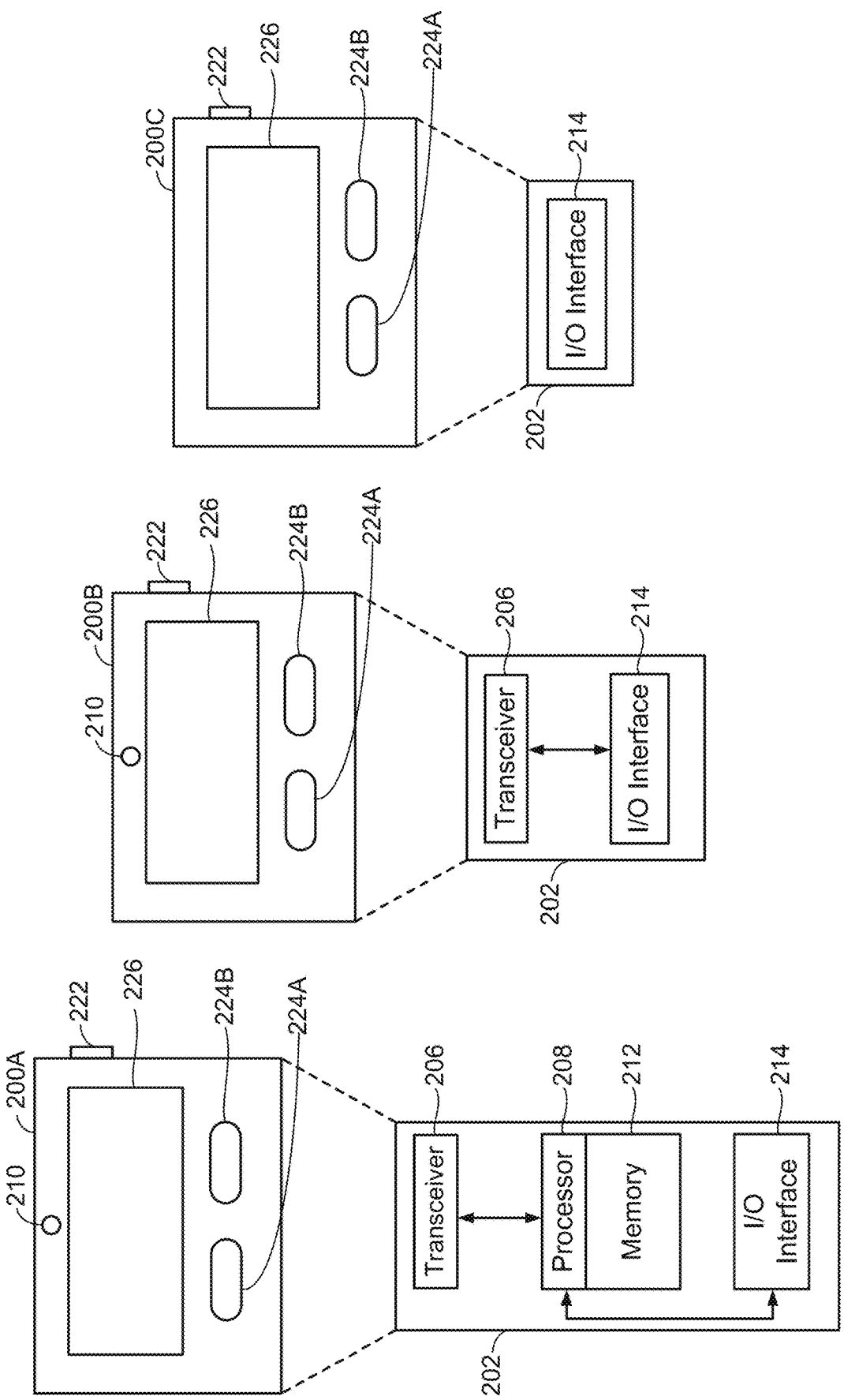
FIG. 2A illustrates an exemplary IoT device in accordance with aspects of the disclosure.
FIG. 2B illustrates an exemplary passive IoT device in accordance with aspects of the disclosure.
FIG. 2C illustrates an exemplary passive IoT device in accordance with other aspects of the disclosure.
Figure 3:
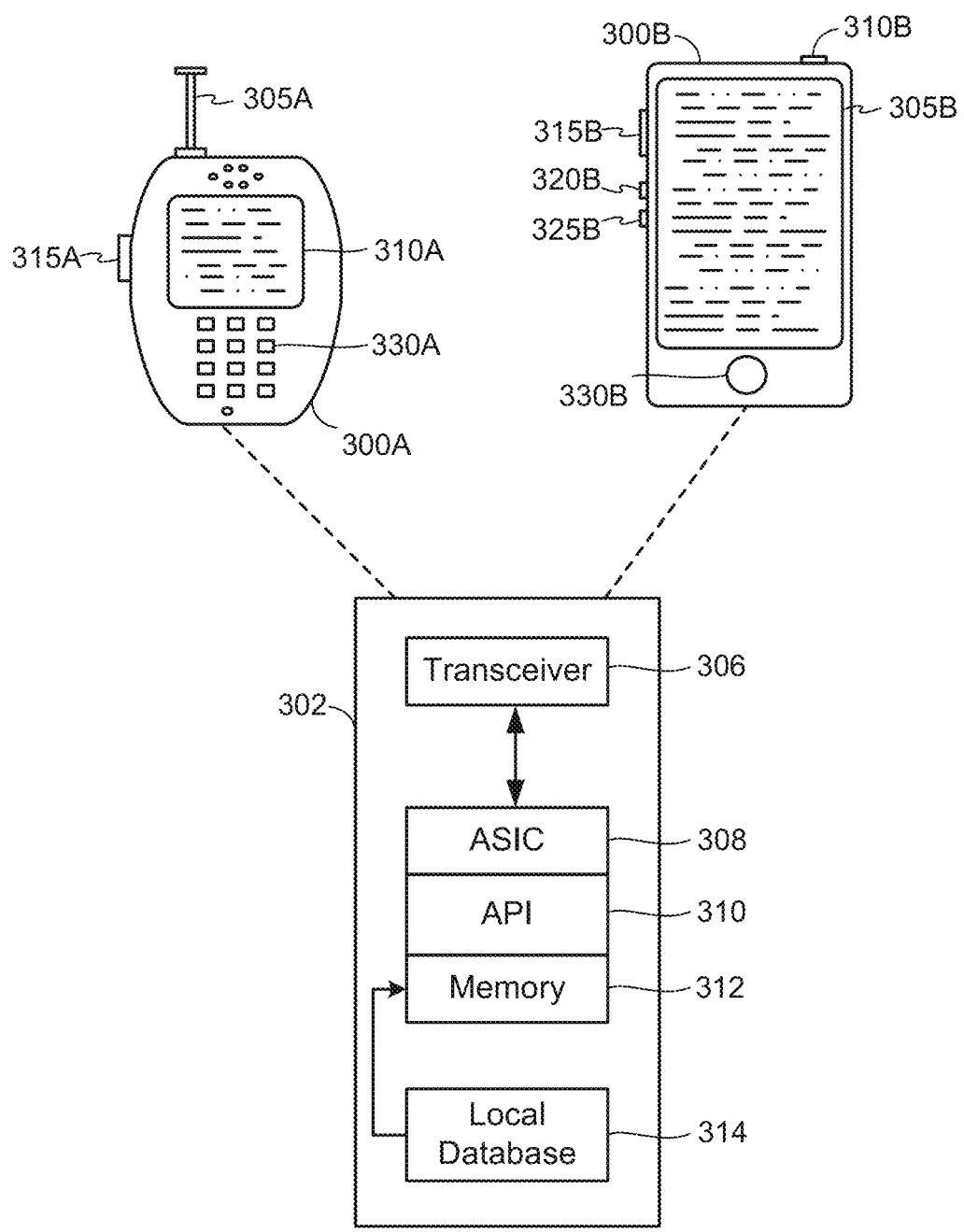
FIG. 3 illustrates examples of user equipments (UEs) in accordance with aspects of the disclosure.
Figure 4A:
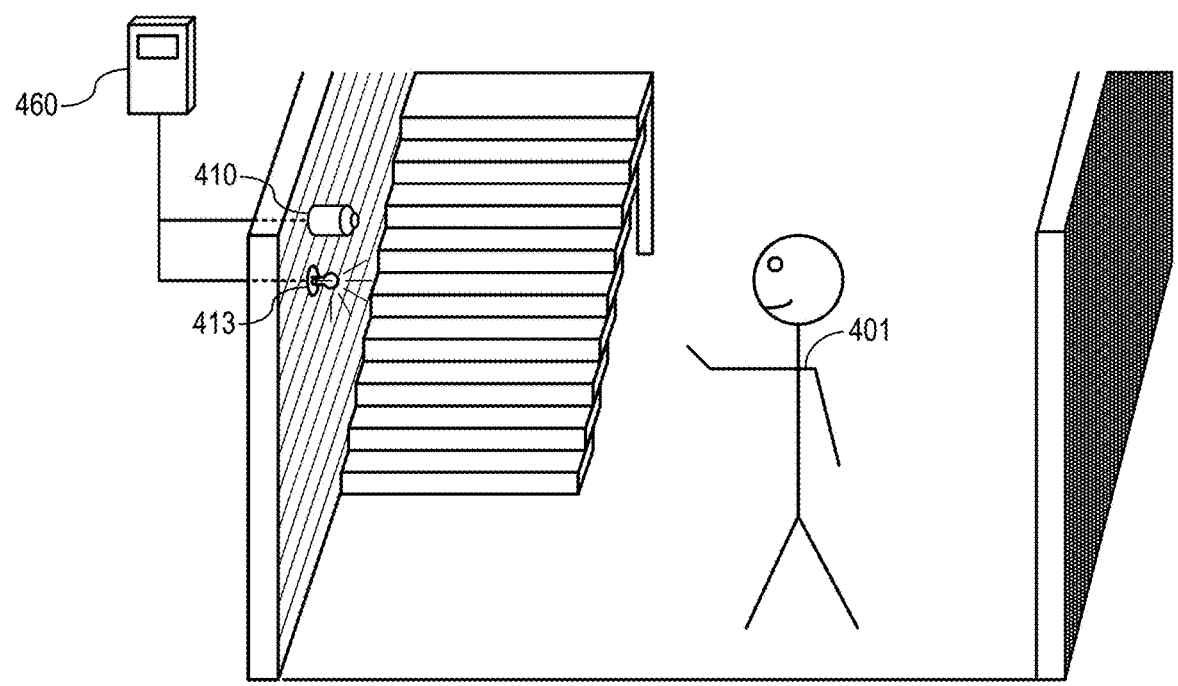
FIG. 4A generally illustrates a first scenario in which various IoT devices interact with a supervisor device, one another, and/or a user of the IoT system.
Figure 4B:
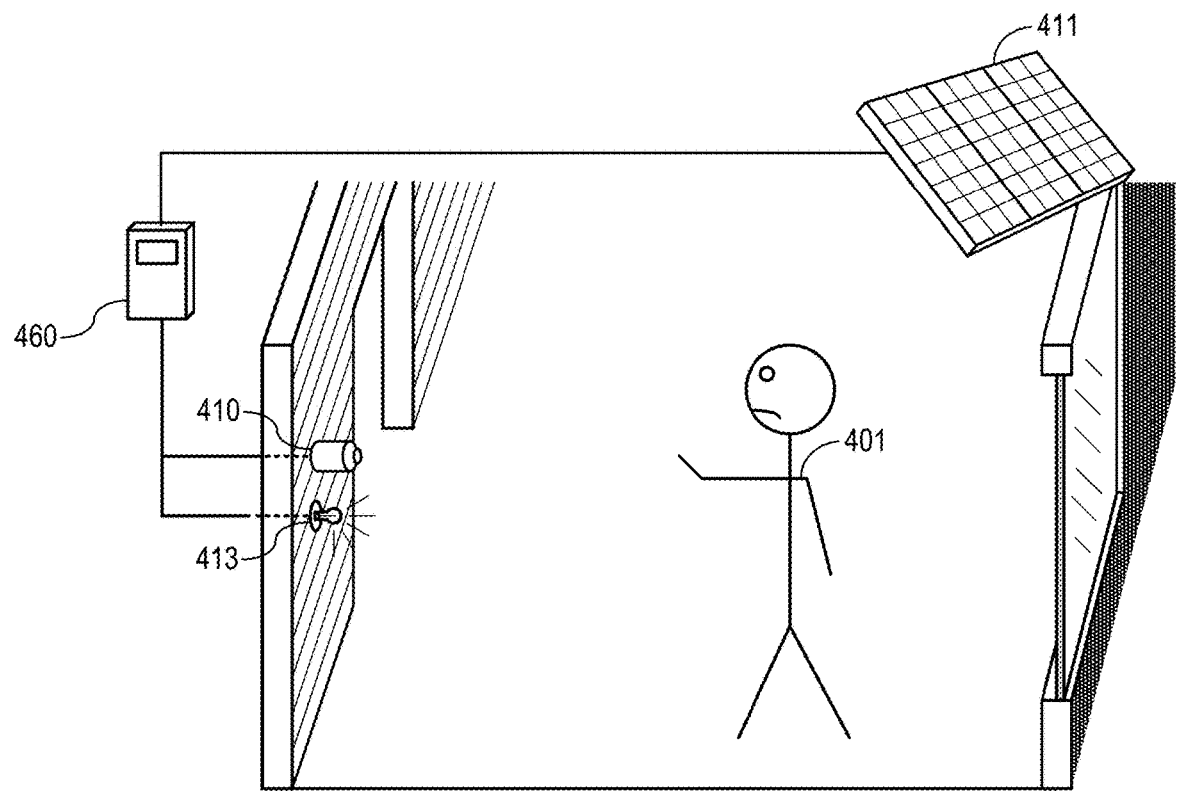
FIG. 4B generally illustrates a second scenario different from the first scenario.

FIGS. 1-3 relate to IoT systems generally. In accordance with aspects of the disclosure, the IoT system in FIGS. 1-3 may be equipped with a gesture recognition algorithm that analyzes received image data and translates the image data into user feedback data. FIGS. 4A-4B depict scenarios in which the gesture recognition algorithm may be utilized for training purposes. The user feedback data generated using the gesture recognition algorithm may subsequently be used to reconfigure the IoT system so as to increase user satisfaction (for example, by maximizing the amount of positive user feedback). The reconfiguring may include confidence adjustments, monitoring of new contextual conditions, adjustment of trigger conditions, or any other suitable reconfiguring, as described in greater detail in the description relating to FIGS. 5-9.

FIG. 1 illustrates a high-level system architecture of an IoT system 100 in accordance with an aspect of the disclosure. The IoT system 100 contains a plurality of IoT devices, which include an image sensor 110, a solar panel 111, an HVAC unit 112 (where HVAC stands for "heating, ventilation, and air conditioning"), a lamp 113, a thermostat 114, a refrigerator 116, and a washer and dryer 118.

As used herein, the term "Internet of Things device" (or "IoT device") may refer to any object (e.g., an appliance, a sensor, etc.) that has an addressable interface (e.g., an Internet protocol (IP) address, a Bluetooth identifier (ID), a near-field communication (NFC) ID, etc.) and can transmit information to one or more other IoT devices over a wired or wireless connection. An IoT system may comprise any combination of IoT devices.

Referring to FIG. 1, IoT devices 110-118 are configured to communicate with an access network (e.g., an access point 120) over a physical communications interface or layer. As shown in FIG. 1, the communication interface may be an air interface 122 and/or a direct wired connection 124. The air interface 122 may comply with a wireless Internet protocol (IP), such as IEEE 802.11. Although FIG. 1 illustrates IoT devices 110-118 communicating over the air interface 122 and washer and dryer 118 communicating over the direct wired connection 124, it will be understood that each IoT device may communicate over a wired or wireless connection, or both.

The Internet 130 includes a number of routing agents and processing agents (not shown in FIG. 1 for the sake of convenience). The Internet 130 is a global system of interconnected computers and computer networks that uses a standard Internet protocol suite (e.g., the Transmission Control Protocol (TCP) and IP) to communicate among disparate devices/networks. TCP/IP provides end-to-end connectivity specifying how data should be formatted, addressed, transmitted, routed and received at the destination.

In FIG. 1, a computer 140, such as a desktop or personal computer (PC), is shown as connecting to the Internet 130 directly (e.g., over an Ethernet connection or Wi-Fi or 802.11-based network). The computer 140 may have a wired connection to the Internet 130, such as a direct connection to a modem or router, which, in an example, can correspond to the access point 120 itself (e.g., for a Wi-Fi router with both wired and wireless connectivity). Alternatively, rather than being connected to the access point 120 and the Internet 130 over a wired connection, the computer 140 may be connected to the access point 120 over air interface 122 or another wireless interface, and access the Internet 130 over the air interface 122. Although illustrated as a desktop computer, computer 140 may be a laptop computer, a tablet computer, a PDA, a smart phone, or the like. The computer 140 may be an IoT device and/or contain functionality to manage an IoT network/group, such as the network/group of IoT devices 110-118.

The access point 120 may be connected to the Internet 130 via, for example, an optical communication system, such as FiOS, a cable modem, a digital subscriber line (DSL) modem, or the like. The access point 120 may communicate with IoT devices 110-118 and the Internet 130 using the standard Internet protocols (e.g., TCP/IP).

Referring to FIG. 1, an IoT server 150 is shown as connected to the Internet 130. The IoT server 150 can be implemented as a plurality of structurally separate servers, or alternately may correspond to a single server. In an aspect, the IoT server 150 is optional, and the group of IoT devices 110-118 may be a peer-to-peer (P2P) network. In such a case, the IoT devices 110-118 can communicate with each other directly over the air interface 122 and/or the direct wired connection 124. Alternatively, or additionally, some or all of IoT devices 110-118 may be configured with a communication interface independent of air interface 122 and direct wired connection 124. For example, if the air interface 122 corresponds to a Wi-Fi interface, one or more of the IoT devices 110-118 may have Bluetooth or NFC interfaces for communicating directly with each other or other Bluetooth or NFC-enabled devices. In a peer-to-peer network, service discovery schemes can multicast the presence of nodes, their capabilities, and group membership. The peer-to-peer devices can establish associations and subsequent interactions based on this information.

The IoT system 100 may optionally include a supervisor device 160. In one aspect of the disclosure, the supervisor device 160 may generally observe, monitor, control, or otherwise manage the various other components in the IoT system 100. For example, the supervisor device 160 may communicate with an access network (e.g., access point 120) over air interface 122 and/or a direct wired connection 124 to monitor or manage attributes, activities, or other states associated with the various IoT devices 110-118 in the IoT system 100. The supervisor device 160 may have a wired or wireless connection to the Internet 130 and optionally to the IoT server 150. The supervisor device 160 may obtain information from the Internet 130 and/or the IoT server 150 that can be used to further monitor or manage attributes, activities, or other states associated with the various IoT devices 110-118. The supervisor device 160 may be a standalone device (as shown), but it will be understood that the supervisor device may include or be included in one of the IoT devices 110-118, the access point 120, the computer 140, or any other electronic device (smartphone, tablet, etc.). For example, the supervisor device 160 may be a panel on an IoT air conditioner, or an application on a smartphone or tablet. The supervisor device 160 may be a physical device or a software application running on a physical device. The supervisor device 160 may include a user interface that can output information relating to the monitored attributes, activities, or other states associated with the IoT devices 110-118 and receive input information to control or otherwise manage the attributes, activities, or other states associated therewith. Accordingly, the supervisor device 160 may generally include various components and support various wired and wireless communication interfaces to observe, monitor, control, or otherwise manage the various components in the IoT system 100.

In addition to the various IoT devices 110-118, the IoT system 100 shown in FIG. 1 may further include one or more passive IoT devices (in contrast to the active IoT devices 110-118) that can be coupled to or otherwise made part of the IoT system 100. In general, the passive IoT devices may include barcoded devices, Bluetooth devices, radio frequency (RF) devices, RFID tagged devices, infrared (IR) devices, NFC tagged devices, or any other suitable device that can provide its identifier and attributes to another device when queried over a short range interface. Active IoT devices may detect, store, communicate, act on, and/or the like, changes in attributes of passive IoT devices.

For example, a first passive IoT device may include a coffee cup and a second passive IoT device container of orange juice. Each may have an RFID tag or barcode. A cabinet IoT device may have an appropriate scanner or reader that can read the RFID tag or barcode to detect when the coffee cup has been added or removed from the cabinet IoT device. The refrigerator IoT device 116 may have an appropriate scanner or reader that can read the RFID tag or barcode to detect when the container of orange juice has been added or removed from the refrigerator IoT device 116. In response to the cabinet IoT device detecting the removal of the coffee cup and the refrigerator IoT device 116 detecting the removal of the container of orange juice, the supervisor device 160 may receive one or more signals that relate to the activities detected at the cabinet IoT device and the refrigerator IoT device 116. The supervisor device 160 may then infer that a user is drinking orange juice from the coffee cup and/or likes to drink orange juice from a coffee cup.

Although the foregoing describes the passive IoT devices as having some form of RFID tag or barcode communication interface, the passive IoT devices may include one or more devices or other physical objects that do not have such communication capabilities. For example, certain IoT devices may have appropriate scanner or reader mechanisms that can detect shapes, sizes, colors, and/or other observable features associated with the passive IoT devices to identify the passive IoT devices. In this manner, any suitable physical object may communicate its identity and attributes and become part of the IoT system 100 and be observed, monitored, controlled, or otherwise managed with the supervisor device 160. Further, passive IoT devices may be coupled to or otherwise made part of the IoT system 100 in FIG. 1 and observed, monitored, controlled, or otherwise managed in a substantially similar manner.

FIG. 2A illustrates a high-level example of an IoT device 200A in accordance with aspects of the disclosure. While external appearances and/or internal components can differ significantly among IoT devices, many IoT devices will have some sort of user interface, which may comprise a display and a means for user input. IoT devices without a user interface may be communicated with remotely over a wired or wireless network, such as air interface 122 in FIG. 1.

As shown in FIG. 2A, in an example configuration for the IoT device 200A, an external casing of IoT device 200A may be configured with a display 226, a power button 222, and two control buttons 224A and 224B, among other components, as is known in the art. The display 226 may be a touchscreen display, in which case the control buttons 224A and 224B may not be necessary. While not shown explicitly as part of IoT device 200A, the IoT device 200A may include one or more external antennas and/or one or more integrated antennas that are built into the external casing, including but not limited to Wi-Fi antennas, cellular antennas, satellite position system (SPS) antennas (e.g., global positioning system (GPS) antennas), and so on.

While internal components of IoT devices, such as IoT device 200A, can be embodied with different hardware configurations, a basic high-level configuration for internal hardware components is shown as platform 202 in FIG. 2A. The platform 202 can receive and execute software applications, data and/or commands transmitted over a network interface, such as air interface 122 in FIG. 1 and/or a wired interface. The platform 202 can also independently execute locally stored applications. The platform 202 can include one or more transceivers 206 configured for wired and/or wireless communication (e.g., a Wi-Fi transceiver, a Bluetooth transceiver, a cellular transceiver, a satellite transceiver, a GPS or SPS receiver, etc.) operably coupled to a processing system 208 including one or more processing devices, such as a microcontroller, microprocessor, application specific integrated circuit, digital signal processor (DSP), programmable logic circuit, or other data processing device. The processing system 208 can execute application programming instructions within a memory system 212 of the IoT device 200A. The memory system 212 can include one or more of read-only memory (ROM), random-access memory (RAM), electrically erasable programmable ROM (EEPROM), flash cards, or any memory common to computer platforms. One or more input/output (I/O) interfaces 214 can be configured to allow the processing system 208 to communicate with and control from various I/O devices such as the display 226, power button 222, control buttons 224A and 224B as illustrated, and any other devices, such as sensors, actuators, relays, valves, switches, and the like associated with the IoT device 200A.

Accordingly, an aspect of the disclosure can include an IoT device (e.g., IoT device 200A) including the ability to perform the functions described herein. As will be appreciated by those skilled in the art, the various logic elements can be embodied in discrete elements, software modules executed on a processor (e.g., the processing system 208) or any combination of software and hardware to achieve the functionality disclosed herein. For example, the transceiver 206, the processing system 208, the memory system 212, and I/O interface 214 may all be used cooperatively to load, store and execute the various functions disclosed herein and thus the logic to perform these functions may be distributed over various elements. Alternatively, the functionality could be incorporated into one discrete component. Therefore, the features of the IoT device 200A in FIG. 2A are to be considered merely illustrative and the disclosure is not limited to the illustrated features or arrangement.

IoT device 200A may also include an always-on vision sensor 210. The always-on vision sensor 210 may be capable of detecting objects and/or gestures to allow the IoT device 200A to more intelligently interact with a user and/or the environment, for example to allow IoT device 200A to receive positive and negative user feedback from a user. In one example, the always-on vision sensor 210 may be capable of counting the number of human bodies that are within a room and, for example, instruct an HVAC system to turn on or off in response thereto. In another example, the always-on vision sensor 210 can detect user gestures as feedback as will be discussed further below. In one implementation, the vision sensor 210 includes a sensor element array (e.g., image sensor, camera, etc.), dedicated CV computation hardware, and a dedicated microprocessor. In various implementations, the dedicated CV computation hardware within always-on vision sensor 210 can perform CV computations in either the digital or analog domain, and examples of such CV computation hardware are known in the art. The CV computation hardware is dedicated CV computation hardware in the sense that it is hardware designed to have little or no functionality other than to compute CV features. In some implementations, the dedicated CV computation hardware may use combinations, sums, or averages of signals associated with blocks of sensor elements or pixels. Therefore, optionally, the always-on vision sensor 210 may also include two dimensional integration hardware. In some implementations, the integral image (which may be an integral image of only a portion or sample window of the image sampled by the sensor element array) generated by the two dimensional integration hardware can be stored in a hardware scanning window array, which may also optionally be included in the always-on vision sensor 210. In one example, the hardware scanning window array includes a random-access memory (RAM) array or other form of analog or digital memory for storing the integral image. Returning to the dedicated CV computation hardware, for example, in a local binary pattern (LBP) implementation of dedicated CV computation hardware, CV computation hardware can include hardware that receives signal values corresponding to image signals—or combinations, sums, or averages of image signals (generated, for example, using an integral image)—and generates a digital LBP label based on the image signals. Although the description above referenced dedicated CV computation hardware as separate from the dedicated microprocessor, it is understood that in some implementations, dedicated CV computation hardware may be implemented in hardware within the dedicated microprocessor. Generating the CV features, such as the LBP labels discussed above, in dedicated hardware can reduce the power of the always-on vision sensor 210 compared to computing the CV features in a processor, for example a general purpose processor such as an application processor or even the dedicated microprocessor. However, the always-on vision sensor 210 may still include a dedicated microprocessor coupled to the CV computation hardware. The dedicated microprocessor receives the hardware-computed CV features from the CV computation hardware and can perform higher-level computer vision operations such as object-class detection (of which face detection can be regarded as a specific case), in which the task is to find the locations and sizes of all objects in an image that belong to a given class, as well as other computer vision operations. Furthermore, the dedicated microprocessor can provide control signals to various subcomponents of the always-on vision sensor 210, including those mentioned above and those not mentioned for brevity. In some implementations, to perform the object-class detection or other computer vision operations, the dedicated microprocessor may use a cascade classifier algorithm to perform object-class detection, for example face detection, or gesture recognition. However, further power savings are possible by implementing the cascade classifier in hardware, to further reduce the computational burden on the microprocessor. The optional cascade classifier hardware includes a hardware implementation of a cascade classifier. The cascade classifier can be configured to detect the presence of a reference object (e.g., a human face, a particular human's face, a human body or upper body to determine a number of humans in a room, an animal face or body) or a reference gesture (which can be considered a sequence of reference objects in time), within the sample window stored in the scanning window array based on CV features computed by the dedicated CV computation hardware. In some implementations, the cascade classifier is trained using machine learning techniques on a data set of images including examples of the reference object the cascade classifier will be trained for and examples of non-objects, for example images of faces and non-faces. Details of the operation of always-on vision sensor 210, including a hardware cascade classifier, can be found in U.S. Pat. Pub. Nos. 2016/0094814 and 2016/0110603, which are both incorporated herein in their entireties. In an alternative implementation, IoT device 200A may not include always-on vision sensor 210, but may instead be in communication with always-on vision sensor 210, as is shown with reference to image sensor 110 in FIG. 1 (where image sensor 110 is connected to a plurality of devices, which could include, for example, IoT device 200A).

FIG. 2B illustrates a high-level example of a passive IoT device 200B in accordance with aspects of the disclosure. In general, the passive IoT device 200B shown in FIG. 2B may include various components that are the same and/or substantially similar to the IoT device 200A shown in FIG. 2A, which was described in greater detail above. In particular, IoT device 200B may include always-on vision sensor 210. As such, for brevity and ease of description, various details relating to certain components in the passive IoT device 200B shown in FIG. 2B may be omitted herein to the extent that the same or similar details have already been provided above in relation to the IoT device 200A illustrated in FIG. 2A.

The passive IoT device 200B shown in FIG. 2B may generally differ from the IoT device 200A shown in FIG. 2A in that the passive IoT device 200B may not have a processing system 208, memory system 212, or certain other components. Instead, in one aspect, the passive IoT device 200B may only include an I/O interface 214 or other suitable mechanism that allows the passive IoT device 200B to be observed, monitored, controlled, managed, or otherwise known within a controlled IoT network. For example, in one aspect, the I/O interface 214 associated with the passive IoT device 200B may include a barcode, Bluetooth interface, radio frequency (RF) interface, RFID tag, IR interface, NFC interface, or any other suitable I/O interface that can provide an identifier and attributes associated with the passive IoT device 200B to another device when queried over a short range interface (e.g., an active IoT device, such as IoT device 200A, that can detect, store, communicate, act on, or otherwise process information relating to the attributes associated with the passive IoT device 200B). In particular implementations of IoT devices 200A and 200B, objects or gestures recognized by always-on vision sensor 210 may be communicated to an appropriate device such as supervisor device 160 of FIG. 1 or other appropriate component of IoT system for training the IoT system, or, in the case of IoT device 200A with onboard processing capabilities, such feedback may be used for training locally without communicating with supervisor device. In alternative implementations, always-on vision sensor 210 may be integrated within supervisor device 160, where supervisor device 160 receives the user feedback, while IoT device 200A and 200B are trained or receive configurations based on training from the supervisor device 160.

Although the foregoing describes the passive IoT device 200B as having some form of RF, barcode, or other I/O interface 214, the passive IoT device 200B may comprise a device or other physical object that does not have such an I/O interface 214. For example, certain IoT devices may have appropriate scanner or reader mechanisms that can detect shapes, sizes, colors, and/or other observable features associated with the passive IoT device 200B. The passive IoT device 200B may be identified based on the detected observable features. In this manner, any suitable physical object may communicate its identity and attributes and be observed, monitored, controlled, or otherwise managed within a controlled IoT network. Returning to an earlier example, a coffee mug may have a recognizable shape, size, color, etc., and a cabinet IoT device may determine that the recognized coffee mug has been taken from or placed into the cabinet.

FIG. 3 illustrates examples of UEs (i.e., client devices) in accordance with an aspect of the disclosure. Referring to FIG. 3, UE 300A is illustrated as a calling telephone and UE 300B is illustrated as a touchscreen device (e.g., a smart phone, a tablet computer, etc.). As shown in FIG. 3, an external casing of UE 300A is configured with an antenna 305A, display 310A, at least one button 315A (e.g., a PTT button, a power button, a volume control button, etc.) and a keypad 330A among other components, as is known in the art. Also, an external casing of UE 300B is configured with a touchscreen display 305B, peripheral buttons 310B, 315B, 320B and 325B (e.g., a power control button, a volume or vibrate control button, an airplane mode toggle button, etc.), at least one front-panel button 330B (e.g., a Home button, etc.), among other components, as is known in the art. While not shown explicitly as part of UE 300B, the UE 300B can include one or more external antennas and/or one or more integrated antennas that are built into the external casing of UE 300B, including but not limited to Wi-Fi antennas, cellular antennas, satellite position system (SPS) antennas (e.g., global positioning system (GPS) antennas), and so on.

While internal components of UEs such as the UEs 300A and 300B can be embodied with different hardware configurations, a basic high-level UE configuration for internal hardware components is shown as platform 302 in FIG. 3. The platform 302 can receive and execute software applications, data and/or commands transmitted from the Internet 130 and/or other remote servers and networks (e.g., IoT server 150, web URLs, etc.). The platform 302 can include a transceiver 306 operably coupled to a processing system 308, including an application specific integrated circuit (ASIC), microprocessor, logic circuit, other data processing device, or any combination thereof. The processing system 308 or other processor executes the application programming interface (API) 310 layer that interfaces with any resident programs in the memory system 312 of the UEs 300A and 300B. The memory system 312 can be comprised of read-only or random-access memory (RAM and ROM), EEPROM, flash cards, or any memory common to computer platforms. The platform 302 also can include a local database 314 that can store applications not actively used in the memory system 312, as well as other data. The local database 314 is typically a flash memory cell, but can be any secondary storage device as known in the art, such as magnetic media, EEPROM, optical media, tape, soft or hard disk, or the like.

Accordingly, an aspect of the disclosure can include a user equipment (UE) including the ability to perform the functions described herein, for example serve as a supervisor device similar to supervisor device 160 of FIG. 1. Furthermore, UEs 300A and/or 300B may include an integrated always-on vision sensor 210 capable of receiving user feedback, including gestures from users for training an IoT system. As will be appreciated by those skilled in the art, the various logic elements can be embodied in discrete elements, software modules executed on a processor or any combination of software and hardware to achieve the functionality disclosed herein. For example, the processing system 308, memory system 312, API 310 and local database 314 may all be used cooperatively to load, store and execute the various functions disclosed herein and thus the logic to perform these functions may be distributed over various elements. Alternatively, the functionality could be incorporated into one discrete component. Therefore, the features of UEs 300A and 300B in FIG. 3 are to be considered merely illustrative and the disclosure is not limited to the illustrated features or arrangement.

The wireless communication to and from the UEs 300A and/or 300B can be based on different technologies, such as CDMA, W-CDMA, time division multiple access (TDMA), frequency division multiple access (FDMA), Orthogonal Frequency Division Multiplexing (OFDM), GSM, or other protocols that may be used in a wireless communications network or a data communications network. As discussed in the foregoing and known in the art, voice transmission and/or data can be transmitted to the UEs using a variety of networks and configurations. Accordingly, the illustrations provided herein are not intended to limit the aspects of the disclosure and are merely to aid in the description of aspects of the disclosure.

FIGS. 4A-4B generally illustrate different scenarios in which various IoT devices interact with a supervisor device, one another, and/or a user of the IoT system.

In FIG. 4A, a user 401 is depicted in a basement of a home equipped with an IoT system analogous to the IoT system 100 depicted in FIG. 1. An image sensor 410 (analogous to the image sensor 110 depicted in FIG. 1 and/or always-on vision sensor 210 of FIG. 2A) is provided in the basement, as is a lamp 413 (analogous to the lamp 113 depicted in FIG. 1). The image sensor 410 and the lamp 413 may be configured to interact with a supervisor device 460 (analogous to the supervisor device 160 depicted in FIG. 1). Although a direct wired connection is shown (analogous to the direct wired connected 124 depicted in FIG. 1), it will be understood that the image sensor 410 and the lamp 413 may communicate with the supervisor device 460 in any suitable manner set forth in the present disclosure. Additionally or alternatively, image sensor 410 and supervisory device 460 may be integrated into a single device. Also, in some implementations, supervisory device 460 may be integrated into the device which it controls, in this example, lamp 413.

It can be appreciated from the previous discussions of IoT devices 200A, 200B and UEs 300A, 300B that each of them may serve as a supervisory device 460.

In the scenario depicted in FIG. 4A, the user 401 has descended the stairs into a dark basement. The image sensor 410 determines that the user 401 has entered the basement, and activates the lamp 413. As noted above, the image sensor 410 may interact with the lamp 413 in any suitable manner, for example, directly using peer-to-peer communications or in tandem with the supervisor device 460. The user 401 takes notice of the fact that the lamp 413 has been activated, and signals her approval with, for example, a hand gesture, a facial gesture, or any other suitable movement. The image sensor 410 and/or supervisor device 460 may be configured to recognize and interpret the gesture.

Given the ability to recognize and interpret gestures, the IoT system depicted in FIG. 4A can obtain real-time feedback directly from the user 401. In particular, when the user 401 gestures her approval, the IoT system may recognize the gesture and interpret the gesture as being a sign of approval.

Based on the positive feedback, the IoT system may be configured to conclude that the user 401 may prefer that the lamp 413 be activated when the user 401 enters the basement. As a result, the IoT system may in the future activate the lamp 413 when the user 401 enters the basement, or increase the likelihood that the activation of the lamp 413 will be triggered when the user 401 enters the basement.

In FIG. 4B, the user 401 is depicted in a sunroom having one or more large windows. In the scenario depicted in FIG. 4B, the user 401 has entered the sunroom, which is brightly illuminated by natural sunlight. The image sensor 410 determines that the user 401 has entered the sunroom, and activates the lamp 413.

The user 401 concludes that it is wasteful to activate the lamp 413 in the sunroom on a bright, sunny day, and may disapprove of the activation of the lamp 413. The user 401 signals her disapproval with a gesture, and the image sensor 410 and/or supervisor device 460 recognizes the gesture and interprets it as being a sign of disapproval. As a result, the IoT system may in the future avoid activation of the lamp 413 when the user 401 enters the sunroom, or decrease the likelihood that activation of the lamp 413 will be triggered when the user 401 enters the sunroom.

In one example scenario, the IoT system may be trained to activate the lamp 413 in the sunroom only if it is cloudy or dark. In some implementations, the IoT system may be able to determine whether there is sufficient sunlight in the sunroom using the solar panel 411 (analogous to the solar panel 111 depicted in FIG. 1). In other implementations, the IoT system may rely on a light sensor, an internal clock and/or a weather indicator received via the Internet 130. Alternatively or additionally, the IoT system may recognize the correlation between the gesture of disapproval and the sunroom being already bright in the example of FIG. 4B. For example, when the room is dark, and the lamp is activated, the user 401 has previously signaled her approval of the activation of the lamp 413. As such, the IoT system recognized a correlation between approval for activation of the lamp 413 when the sunroom is dark, but disapproval for activation of the lamp 413 when the sunroom is bright. Hence, the IoT system may in the future avoid activation of the lamp 413 when the user enters the sunroom on a sunny day or when the ambient light in the room is sufficient and/or decrease the likelihood of doing so, but keep the likelihood of activating the lamp 413 the same when the sunroom is dark. Hence, the IoT system may take the inputs of all sensor data available to it, including, for example, an ambient light sensor.

Accordingly, the user 401 may train the IoT system by providing a mixture of positive user feedback (when it is sunny) and negative user feedback (when it is cloudy or dark). The training may be accomplished by recognizing the gestures of the user 401 and interpreting the recognized gesture. For example, identifying the recognized gesture as indicating positive user feedback, negative user feedback, or any other suitable type of feedback. The training may be promoted by taking note of contextual conditions (for example, sun exposure levels detected by the solar panel 411), and reconfiguring the trigger for performing the lamp 413 activation in response to the contextual conditions.

Figure 5:
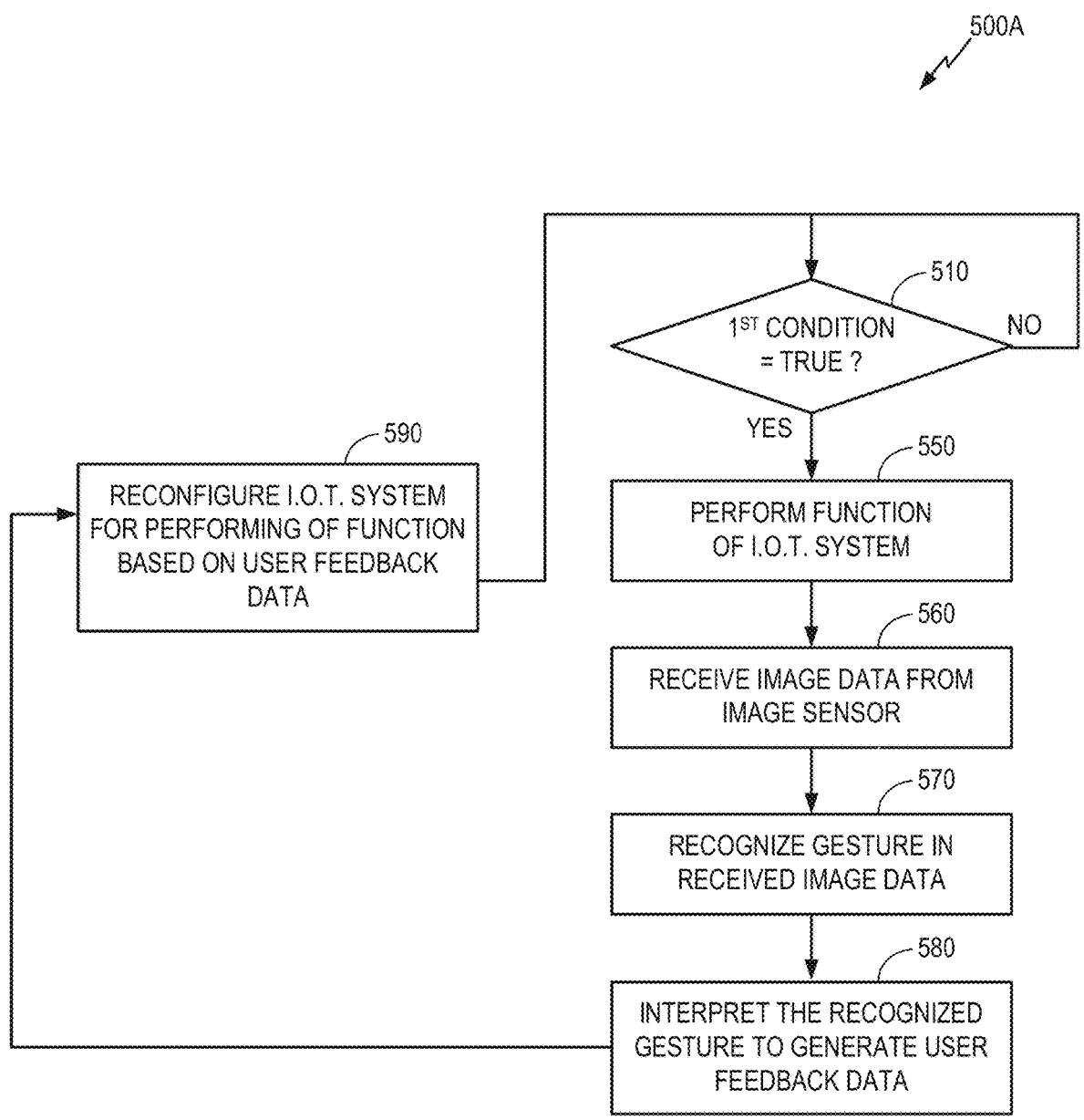
FIG. 5 generally illustrates a method for configuring and/or reconfiguring an IoT system to perform a function in response to contextual data.

FIG. 5 generally illustrates a method 500A for configuring and/or reconfiguring an IoT system to perform a function in response to contextual data. The method 500A may be performed by, for example, one or more components of an IoT system analogous to the IoT system 100 depicted in FIG. 1. As will be discussed in greater detail below, the method 500A may be reconfigured any number of times in accordance with aspects of the disclosure. Examples of methods that may emerge from the reconfiguration of the method 500A include the method 500B depicted in FIG. 7 and the method 500C depicted in FIG. 9.

At 510, the method 500A identifies one or more triggering conditions, determines whether the one or more triggering conditions holds, and proceeds to 550 when triggering occurs. For example, if a first condition $C_1$ holds (i.e., $C_1$=TRUE), then the method 500A proceeds to 550 ('yes' at 510). If $C_1$ does not hold (i.e., $C_1$=FALSE), then the method 500A returns to 510 ('no' at 510). Accordingly, $C_1$=TRUE constitutes a triggering condition for proceeding to 550.

As used herein, a condition may refer to any contextual condition sensed by the IoT system, whether through direct detection of the condition using an appropriate sensor within the IoT system, or data received from the network or the Internet 130. The condition may be a characteristic of an environment in which the IoT system is situated (for example, $C_1$=TRUE if the user 401 is present in the basement), or may be a detected change in condition (for example, an event or transition) that occurs within the environment (for example, the user 401 enters the basement, causing a presence indicator to transition from FALSE to TRUE).

For illustrative purposes, $C_1$ is described herein as being either TRUE or FALSE, although other arrangements are possible. For example, $C_1$ may be a temperature sensed by the thermostat 114 (for example, a value within a range of temperatures from 0°-200°), or a wattage generated by the solar panel 411 (for example, a value within a range of wattages from 0-1,000 W). In some implementations, the value of $C_1$ may be mapped to a TRUE/FALSE determination using a threshold. For example, $C_1$ may be set such that $C_1$=TRUE if sensed temperature is greater than a threshold temperature of 75°, and $C_1$=FALSE if sensed temperature is not greater than the threshold temperature.

At 550, the method 500A performs a function of the IoT system in response to the triggering at 510 (i.e., the determination that $C_1$ holds). To return to a previous example, $C_1$ may be a user 401 presence in the basement depicted in FIG. 4A. The IoT system may determine that the user 401 depicted in FIG. 4A is present in the basement (i.e., $C_1$=TRUE), thus triggering the IoT system to activate the lamp 413 in the basement.

At 560, the method 500A receives image data from an image sensor, for example, the image sensor 410 depicted in FIGS. 4A-4B. Image sensor 410 can be included as a stand-alone image sensor as depicted in FIGS. 4A-4B, but may additionally or alternatively be included in an IoT device similar to IoT devices 200A, 200B and/or 200C (analogous to image sensor 210), or in a mobile device capable to sending data to the IoT system such as UEs 300A and/or 300B. The image data may include, for example, a sequence of image frames. In some implementations, the image data may be received and processed by the image sensor 410 and/or at a supervisor device analogous to the supervisor device 460 depicted in FIGS. 4A-4B. In some implementations, the image data may be captured during a finite time window having a predetermined duration, for example, a time window that commences when the triggering at 510 occurs and terminates after a predetermined amount of time (or number of frames). The duration of the time window may reflect an amount of time within which user feedback is expected to be received, for example, twenty seconds.

At 570, the method 500A recognizes a gesture in the image data received at 560. The IoT system may only be capable of recognizing a single gesture, or alternatively, any number of different gestures. The recognizing may be performed using any suitable image processing technique. In some implementations, the gesture may be present in a single image frame, for example, a smiling face, frowning face, a thumbs up, a thumbs down, or other gesture capable of being captured in a single image frame. In other implementations, the gesture may be a multi-component gesture having a sequence of different gesture components in different image frames, for example, a user nodding his or her head, moving his or her head from left to right, a hand gesture, or other multi-component gesture having a sequence of different gesture components in different image frames.

At 580, the method 500A interprets the recognized gesture to generate user feedback data. As noted above, the IoT system may be capable of recognizing any number of different gestures. The IoT system may be configured to distinguish between the any number of different gestures, and may be further configured to translate a particular recognized gesture into a particular type of feedback. In the example of FIG. 4A, the IoT system recognizes a first gesture and interprets the recognized first gesture as signifying approval (i.e., positive user feedback). The result is positive user feedback data that may be generated and/or recorded in a memory system. In the example of FIG. 4B, the IoT system recognizes a second gesture distinct from the first gesture and interprets the recognized second gesture as signifying disapproval (i.e., negative user feedback). The result is negative user feedback data that may be generated and/or recorded in a memory system. As will be discussed in greater detail below, the user feedback data (positive, negative, or otherwise) may be used to reconfigure the IoT system in accordance with aspects of the disclosure. To that end, the IoT system may store the generated user feedback data for later use.

At 590, the method 500A reconfigures the IoT system for future performances of the function at 550 based on the user feedback data, which in turn is generated using recognized gestures from one or more users. As such, the method 500A includes reconfiguring the IoT system for a future performance of the function based on the recognized gesture of 570.

In some implementations, the reconfiguring may comprise increasing a confidence level associated with the currently-used triggering condition(s). For example, in the example of FIG. 4A, the user 401 enters the basement, the lamp 413 is activated, and the user 401 signals his or her approval to the image sensor 410. The IoT system may track a correlation between instances of the performing of the function (activate lamp 413 if $C_1$=TRUE, $C_1$ being user 401 presence) and instances of receiving of positive user feedback. The IoT system may track the correlation using a first correlation score $S_1$. The value of $S_1$ may be between −1 and +1, wherein −1 represents a maximum negative correlation and +1 represents a maximum positive correlation. A value of $S_1$=0 may indicate that the correlation between $C_1$ and approval of the performed function is unknown, ambiguous, and/or non-existent. When the user 401 signals his or her approval to the image sensor 410, the IoT system may increase $S_1$ relative to its previous value (i.e., tending toward +1).

In other implementations, the reconfiguring may comprise decreasing a confidence level associated with the currently-used triggering condition(s). For example, in the example of FIG. 4B, the user 401 enters the naturally-lit sunroom, the lamp 413 is activated, and the user 401 signals his or her disapproval to the image sensor 410. When the user 401 signals his or her disapproval to the image sensor 410, the IoT system may decrease $S_1$ relative to its previous value (i.e., tending toward −1).

As a result of one or more reconfigurings of the method 500A, a new method 500B may emerge, as will be discussed in greater detail below with reference to FIG. 7. In addition, or as an alternative, to increasing and/or decreasing $S_1$, the reconfiguring may comprise commencement of monitoring of additional contextual conditions beyond the first condition $C_1$, as will be discussed in greater detail below with reference to FIG. 6.

Figure 6:
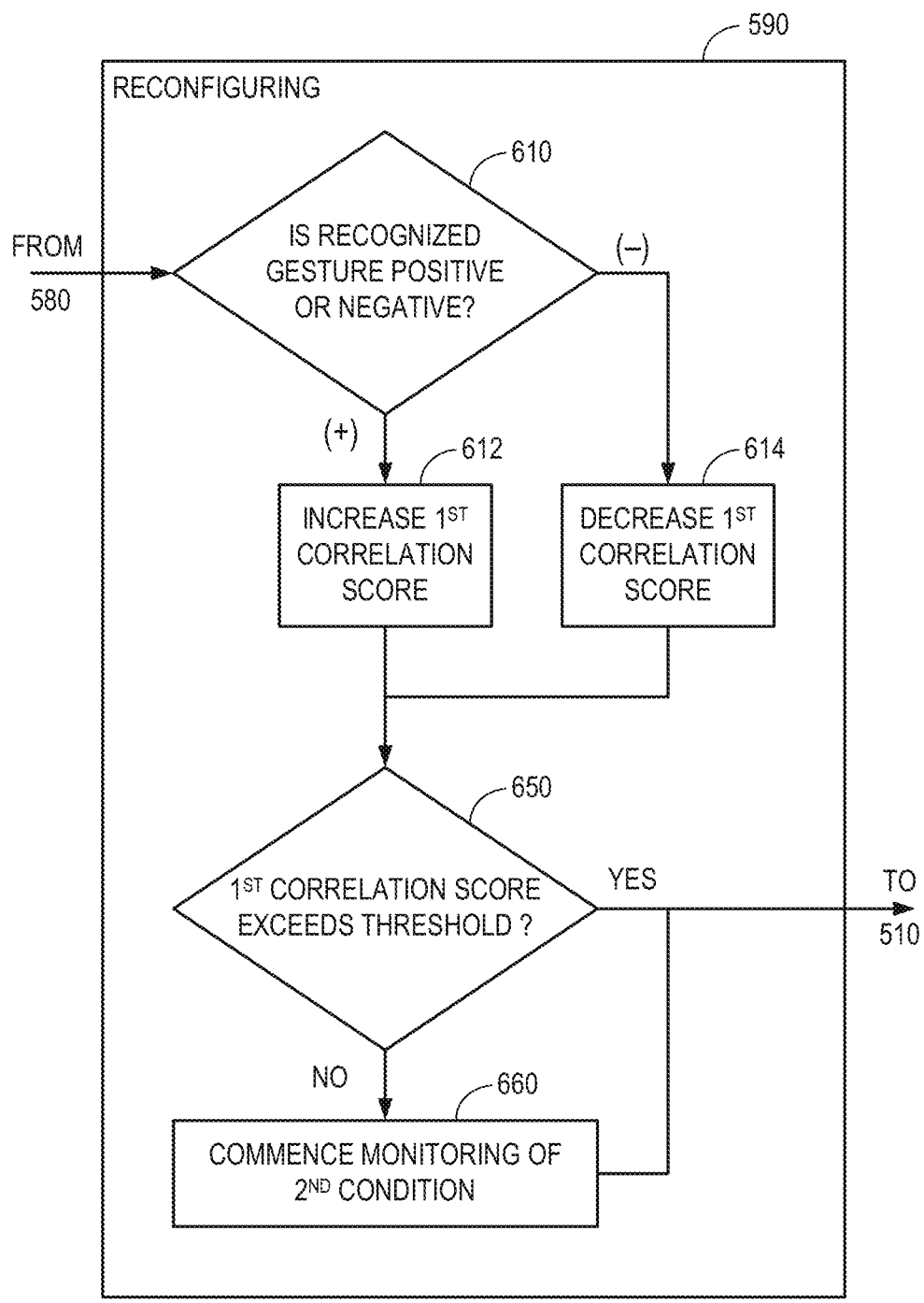
FIG. 6 generally illustrates an example implementation of a reconfiguration algorithm for use in the method depicted in FIG. 5.

FIG. 6 generally illustrates an example implementation of a reconfiguration algorithm. The reconfiguration algorithm depicted in FIG. 6 may be an example implementation of the reconfiguring algorithm depicted at 590 of FIG. 5.

At 610, the reconfiguring algorithm, having recognized and interpreted a gesture (at 570 and 580), determines whether the recognized gesture is positive user feedback or negative user feedback. (For simplicity of illustration, it will be assumed that the IoT system is capable of recognizing two gestures, the two gestures comprising a positive feedback gesture signifying approval and a negative feedback gesture signifying disapproval.) If the recognized gesture is positive ('(+)' at 610), then the reconfiguring algorithm proceeds to 612. If the recognized gesture is negative ('(−)' at 610), then the reconfiguring algorithm proceeds to 614.

At 612, a first correlation score $S_1$ is increased. At 614, by contrast, the first correlation score $S_1$ is decreased. As noted above, $S_1$ may reflect a confidence level associated with future performances of the function at 550 in response to the trigger that is currently used by the IoT system (i.e., $C_1$=TRUE) to determine whether the function should be performed at 550.

The increasing and decreasing may be at any suitable increment or decrement and may be based on any suitable technique. In some implementations, $S_1$ may increase or decrease at predetermined intervals, for example, ±0.1. In other implementations, a statistical correlation may be calculated. The statistical correlation may be based on any number of instances of feedback, for example, ten of the most recent instances, twenty of the most recent instances, or all previously recorded instances.

In some implementations, a correlation score may refer to an explicit value recorded in memory. In other implementations, the correlation score may be an implied value that is not directly retrievable. For example, the correlation score may be one or more factors related to a machine learning algorithm. In some implementations, the correlation score is based on weighted feedback. For example, more recent feedback may be weighted more heavily (e.g., assigned a higher weight coefficient) than more remote feedback (which may be assigned a lower weight coefficient).

As noted above, the recognition performed at 610 may be as simple as distinguishing between two (or fewer) recognized gestures. However, it will be understood that more complex determinations are possible in accordance with aspects of the disclosure, for example, recognition of three or more gestures. For example, a third recognized gesture may be interpreted as strong approval (resulting in a relatively greater increase of $S_1$) and a fourth recognized gesture may be interpreted as strong disapproval (resulting in a relatively greater decrease of $S_1$). In some implementations, if the user 401 does not make a recognized gesture, this may be interpreted as mild positive feedback signifying tacit approval (resulting in a correspondingly mild increase of $S_1$).

At 650, the reconfiguring algorithm may determine whether the first correlation score $S_1$ exceeds a confidence threshold. If $S_1$ exceeds the confidence threshold ('yes' at 650), then the reconfiguring depicted at 590 in FIG. 5 may be complete, and the method 500A may return to 510, as depicted in FIG. 5. If $S_1$ does not exceed the confidence threshold ('no' at 650), then the reconfiguring algorithm may proceed to 660 before returning to 510.

At 660, the reconfiguring algorithm commences monitoring of a second condition $C_2$. As will be understood from FIG. 6, the IoT system initially assumes that knowledge of the first condition $C_1$ is sufficient for determining whether to perform the function at 550. However, after a certain amount of negative feedback is received from the user 401, the IoT system may lose confidence in $C_1$=TRUE as the sole triggering condition used at 510. This loss of confidence may be reflected in any suitable manner, for example, as a first correlation score $S_1$ that is decreased below the confidence threshold.

As noted above, the number of monitored conditions is limited only by the storage and processing powers of the IoT system. Accordingly, although the remainder of the disclosure makes reference to just two conditions, $C_1$ and $C_2$, it will be understood that any number of conditions $C_3$, $C_4$, ... $C_N$ may be monitored.

In some implementations, the IoT system may have limited storage and/or processing powers. As a result, the IoT system may not commence monitoring of the second condition $C_2$ until it is necessary to improve the performance of the IoT system (i.e., when $S_1$ falls below the confidence threshold). This is the approach depicted in FIG. 6, as noted above. However, in an IoT system with excess storage and/or processing power, every monitorable condition may be monitored at all times and the results may be recorded and/or stored indefinitely, even if they have no known relevance at the time that they are recorded and/or stored to any function of the IoT system. Accordingly, instead of commencing to monitor the second condition $C_2$ (as at 660), the IoT system may simply gather the already-recorded data relating to $C_2$, $C_3$, $C_4$, ... $C_N$, or any combination thereof. The IoT system may then generate respective correlation scores $S_2$, $S_3$, $S_4$, ... $S_N$ based on the recorded data and identify the best condition for determining whether the performance of the function at 550 should be triggered. Additionally or alternatively, the IoT system may also generate any number of combination correlation scores based on the recorded data and identify the best combination of conditions under which the function of 550 should be performed. The combination correlation scores may be based on couplets of different conditions (for example, $C_1$ and $C_2$), but it will be understood that the combination correlation scores may also be based on triplets ($C_1$, $C_2$, and $C_3$), quadruplets ($C_1$, $C_2$, $C_3$, and $C_4$), etc.

Figure 7:
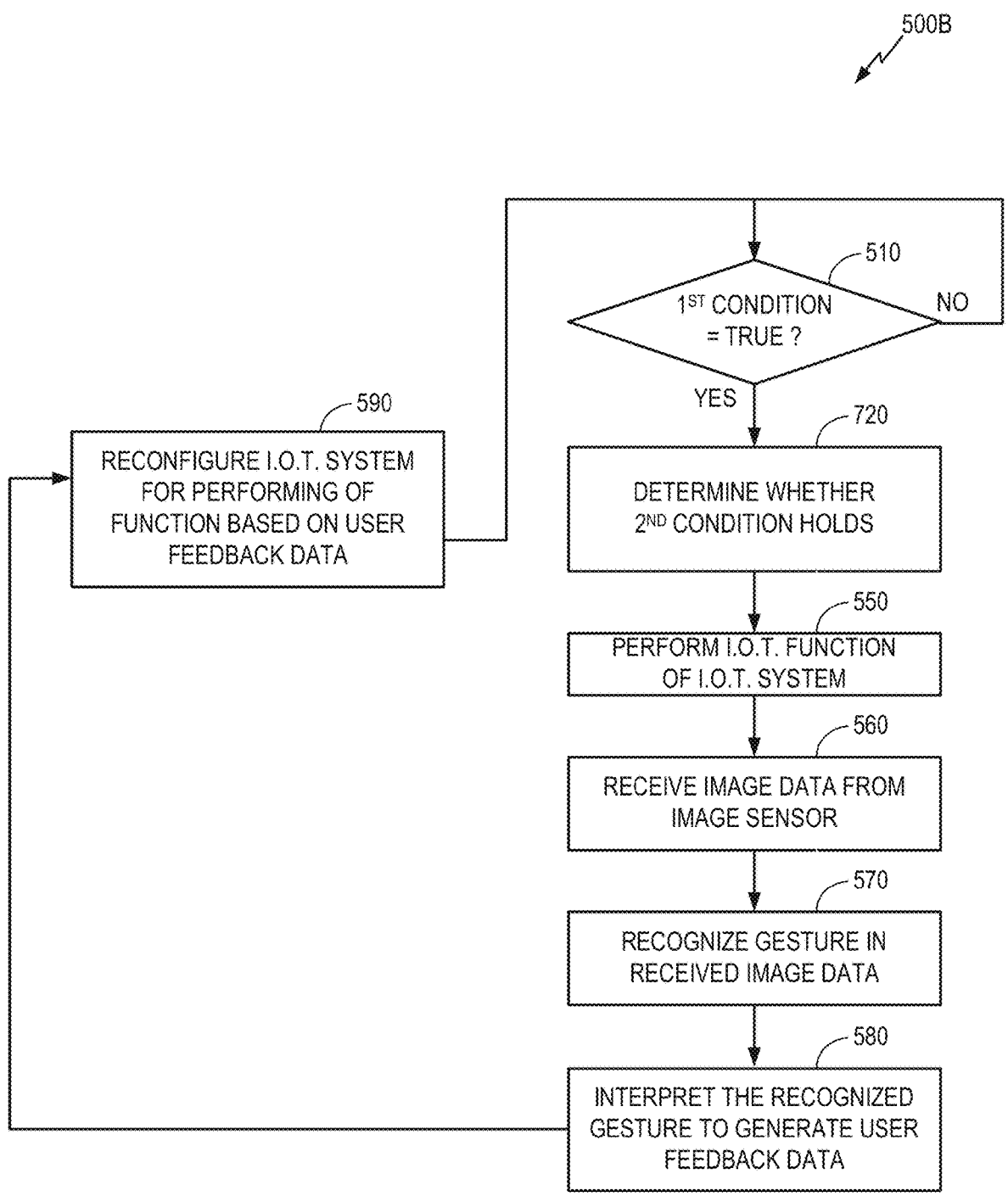
FIG. 7 generally illustrates another method for configuring and/or reconfiguring an IoT system to perform a function in response to contextual data.

FIG. 7 generally illustrates a method 500B for configuring and/or reconfiguring an IoT system to perform a function in response to contextual data. The method 500B may be performed by, for example, one or more components of an IoT system analogous to the IoT system 100 depicted in FIG. 1. The method 500B may be analogous in some respects to the method 500A, and may, in some implementations, constitute a result of the reconfiguring performed at 590 in FIG. 5 and/or FIG. 6. For example, like the method 500A, the method 500B may include the determining at 510, the performing of the function at 550, the receiving of the image data at 560, the recognizing at 570, the interpreting at 580, and the reconfiguring at 590. However, unlike the method 500A, the method 500B does not proceed directly to the performing of the function at 550 in response to a determination that $C_1$=TRUE ('yes' at 510). Instead, the method 500B proceeds to 720 before proceeding to the performing of the function at 550.

At 720, the method 500B determines whether a second condition $C_2$ holds. The determining at 720 may further include recording and/or storage in a memory system of data associated with $C_2$ (for example, a particular value of $C_2$). It will be understood that the determining at 720, which has been inserted into the prior-use method 500A in order to produce the current-use method 500B, may have been inserted as a result of the reconfiguring algorithm depicted in FIG. 6.

As a result of one or more reconfigurings of the method 500B, a new method 500C may emerge, as will be discussed in greater detail below with reference to FIG. 9.

Figure 8:
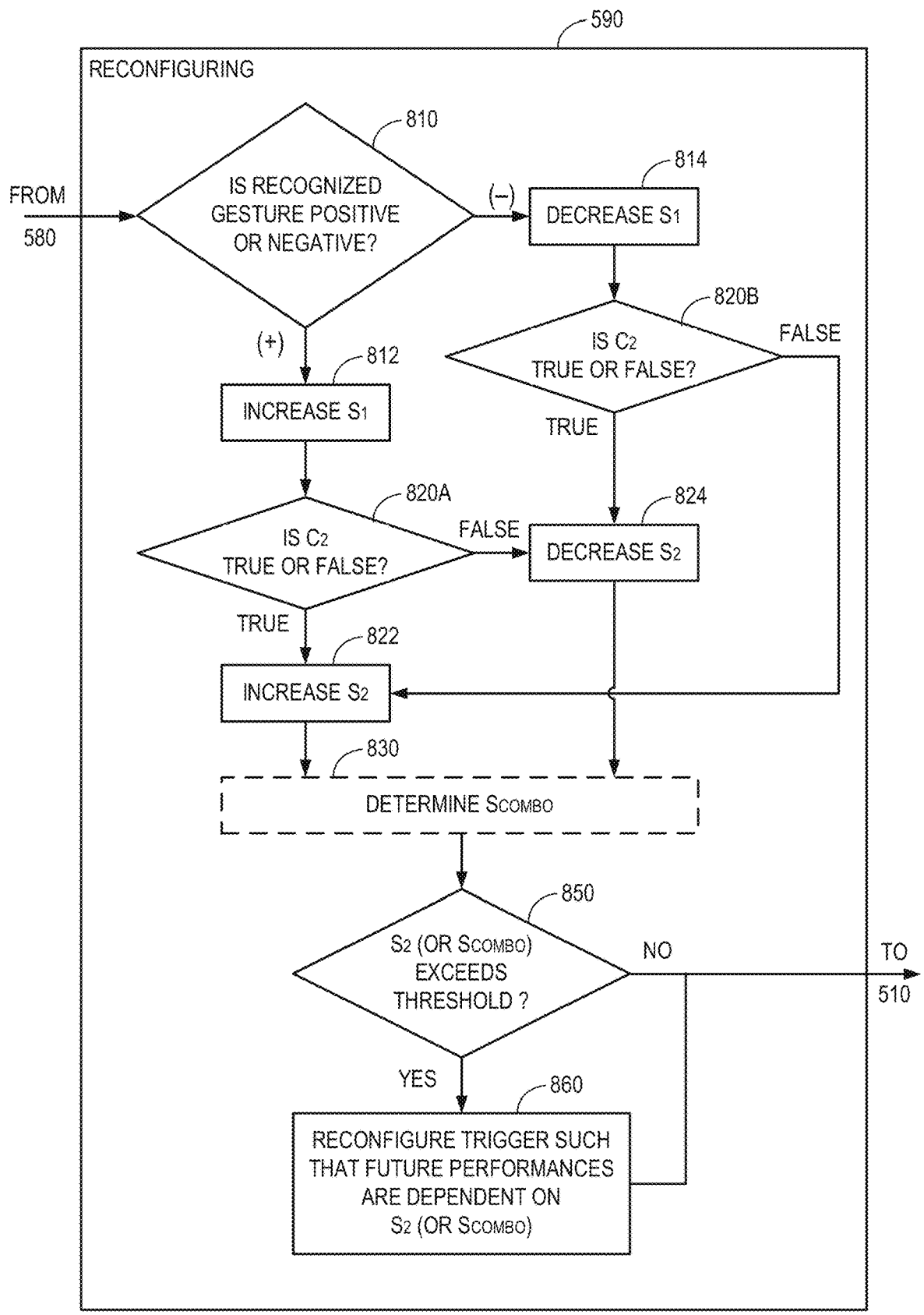
FIG. 8 generally illustrates an example implementation of another reconfiguration algorithm.

FIG. 8 generally illustrates an example implementation of another reconfiguration algorithm. The reconfiguration algorithm depicted in FIG. 8 may be an example implementation of the reconfiguring at 590 depicted in FIG. 7.

Once the IoT system commences monitoring of additional conditions (for example, $C_2$ as depicted in FIG. 7), the IoT system can also begin tracking a correlation score for each additional condition (for example, a second correlation score $S_2$). In FIG. 8, the reconfiguring algorithm tracks $S_1$ and $S_2$. The IoT system then uses the correlation scores to determine whether the triggering condition (which currently uses $C_1$=TRUE as the sole triggering condition) can be refined (for example, by expressing the triggering condition in terms of $C_2$ or a combination of $C_1$ and $C_2$). These refinements may increase the likelihood of receiving positive user feedback at 560-580.

At 810, the reconfiguring algorithm, having recognized and interpreted a gesture (at 560-580), determines whether the recognized gesture is positive user feedback or negative user feedback. If the recognized gesture is positive ('(+)' at 810), then the reconfiguring algorithm proceeds to 812. If the recognized gesture is negative ('(−)' at 810), then the reconfiguring algorithm proceeds to 814.

At 812, a first correlation score $S_1$ is increased, and then the recognition algorithm proceeds to 820A. At 814, by contrast, the first correlation score $S_1$ is decreased, and then the recognition algorithm proceeds to 820B. As noted above, $S_1$ may reflect a confidence level associated with future performances of the function at 550 in response to the presently-used triggering condition (i.e., $C_1$=TRUE).

At 820A, the recognition algorithm determines whether the second condition $C_2$ is TRUE or FALSE. If $C_2$=TRUE, then the reconfiguring algorithm proceeds to 822. If $C_2$=FALSE, then the reconfiguring algorithm proceeds to 824.

At 820B, the recognition algorithm makes the same determination as to whether the second condition $C_2$ is TRUE or FALSE, but proceeds differently from the determining at 820A. In particular, if $C_2$=FALSE, then the reconfiguring algorithm proceeds to 822. If $C_2$=TRUE, then the reconfiguring algorithm proceeds to 824.

At 822, a second correlation score $S_2$ is increased. At 824, by contrast, the second correlation score $S_2$ is decreased. As noted above, $S_2$ may reflect a confidence level associated with future performances of the function at 550 in response to the trigger $C_2$=TRUE.

At 830, the recognition algorithm optionally determines one or more combination correlation scores $S_{combo1}$, $S_{combo2}$, $S_{combo3}$, and/or $S_{combo4}$ corresponding to different combinations of conditions. For example, the one or more combination correlation scores may be associated with the particular combinations of conditions shown in Table 1.

TABLE 1

| correlation score | $C_1$ | $C_2$ |
|---|---|---|
| $S_{combo1}$ | TRUE | TRUE |
| $S_{combo2}$ | TRUE | FALSE |
| $S_{combo3}$ | FALSE | TRUE |
| $S_{combo4}$ | FALSE | FALSE |

As noted above, the one or more combination correlation scores $S_{combo1}$, $S_{combo2}$, $S_{combo3}$, and/or $S_{combo4}$ may reflect a confidence level associated with future performances of the function at 550 in response to mixed triggers. For brevity, the details of the determining at 830 are not depicted in FIG. 8. However, it will be understood that any particular combination correlation score may be determined using a method similar to the increasing and/or decreasing of $S_2$, as described above with respect to 820A, 820B, 822, and 824. For example, suppose that positive feedback is received at 810. To determine $S_{combo2}$ at 830, the recognition algorithm may first determine whether (($C_1$=TRUE) AND ($C_2$=FALSE))=TRUE.

If it is true that (($C_1$=TRUE) AND ($C_2$=FALSE)), then $S_{combo2}$ may be increased in an operation analogous to the increasing at 812 and/or the increasing at 822. By contrast, if it is not true that (($C_1$=TRUE) AND ($C_2$=FALSE)), then $S_{combo2}$ may be decreased in an operation analogous to the decreasing at 814 and/or the decreasing at 824.

At 850, the reconfiguring algorithm may determine whether any of the alternative correlation scores (i.e., $S_2$ and/or $S_{comboX}$) exceeds a confidence threshold. The confidence threshold may be set to, for example, the first correlation score $S_1$ determined at 812 or 814, or any other suitable value. If any of the alternative correlation scores exceed the confidence threshold ('yes' at 850), then the reconfiguring algorithm may proceed to 860 before returning to 510. If none of the additional correlation scores exceed the confidence threshold ('no' at 850), then the method 500A may return to 510 directly, as depicted in FIG. 8.

It will be understood that the determination at 850 is an inquiry into whether one of the additional conditions (for example, $C_2$=FALSE) or a particular combination of conditions (for example, $C_1$=TRUE and $C_2$=FALSE) will be a better predictor of positive user feedback than the presently-used triggering condition, which relies solely on the first condition $C_1$. If $S_2$ and/or $S_{comboX}$ is greater than $S_1$, then this may indicate that $C_1$ should not be the sole triggering condition. As will be discussed in greater detail below, the reconfiguring algorithm may reconfigure the IoT system such that at least one condition other than $C_1$ is used as a basis for determining whether to perform the function at 550.

At 860, the reconfiguring algorithm may reconfigure the triggering condition for future performances of the function (performed at 550). For example, in FIG. 5, the method 500A proceeds to perform the function at 550 in accordance with the triggering condition $C_1$=TRUE. Likewise for the method 500B depicted in FIG. 7. However, after the reconfiguring performed at 860, one or more additional conditions (e.g., $C_2$) may be checked before proceeding to perform the function at 550. One possible result of such a reconfiguring is depicted in FIG. 9, as will be discussed in greater detail below.

Figure 9:
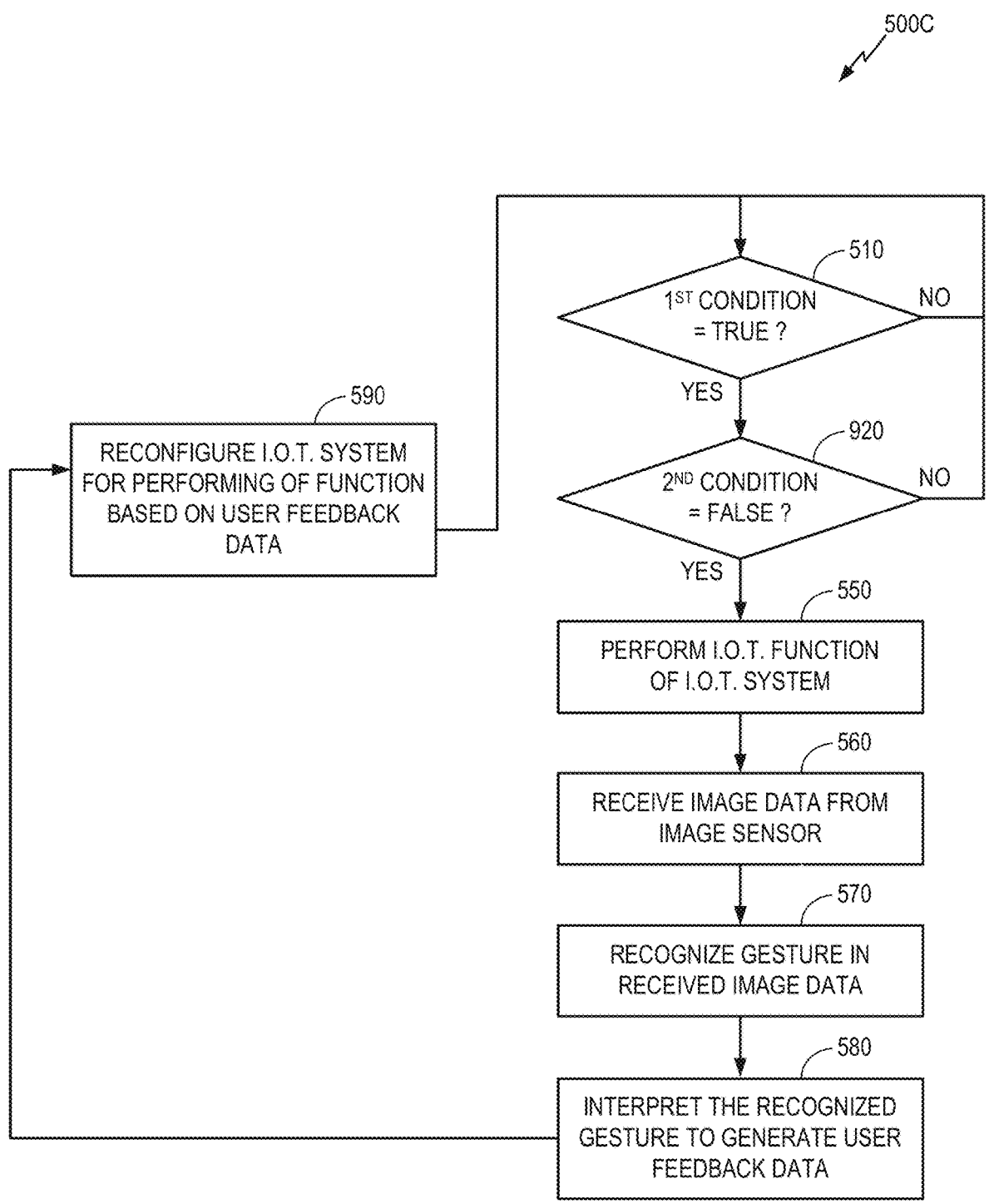
FIG. 9 generally illustrates yet another method for configuring and/or reconfiguring an IoT system to perform a function in response to contextual data.

FIG. 9 generally illustrates a method 500C for configuring and/or reconfiguring an IoT system to perform a function in response to contextual data. The method 500C may be performed by, for example, one or more components of an IoT system analogous to the IoT system 100 depicted in FIG. 1. The method 500C may be analogous in some respects to the method 500A and/or the method 500B, and may, in some implementations, constitute a result of the reconfiguring performed at 590 in one or more of FIGS. 5-8. For example, like the method 500A and the method 500B, the method 500C may include the determining at 510, the performing of the function at 550, the receiving of the image data at 560, the recognizing at 570, the interpreting at 580, and the reconfiguring at 590. However, unlike the method 500A and the method 500B, the method 500C does not proceed to the performing of the function at 550 in response to a determination that $C_1$=TRUE ('yes' at 510). Instead, the method 500C proceeds to 920.

At 920, the method 500C determines whether a second condition $C_2$ holds. In particular, if $C_2$=FALSE, then the method 500A proceeds to 550 ('yes' at 920). But if $C_2$=TRUE, then the method 500C returns to 510 ('no' at 920). Accordingly, (($C_1$=TRUE) AND ($C_2$=FALSE)= TRUE) constitutes a trigger for proceeding to 550, and any other combination of $C_1$ and $C_2$ results in a return to 510.

The determining at 920 may further include recording and/or storage in a memory system of data associated with $C_2$ (for example, a particular value of $C_2$ or a TRUE/FALSE condition of $C_2$), similar to the determining at 720 depicted in FIG. 7.

Recall that in FIG. 8, the IoT system determined at 850 whether at least one additional correlation score (for example, $S_{combo2}$) exceeded a confidence threshold, and proceeded to 860 when the confidence threshold was exceeded ('yes' at 850). Recall further that at 860, the IoT system reconfigured the triggering condition for future performances of the function (performed at 550). The method 500C depicted in FIG. 9 may represent one possible result of that reconfiguration. In the method 500C, the triggering condition is no longer based solely on a determination that $C_1$=TRUE (as in the method 500A and the method 500B). Instead, to proceed to the performing of the function at 550, the IoT system must make two determinations: a first determination at 510 that $C_1$=TRUE and a second determination at 920 that $C_2$=FALSE.

We will now return to the example scenarios of FIGS. 4A-4B to illustrate how, in one particular scenario, an IoT system may be trained using gesture recognition.

In the scenario depicted in FIG. 4A, the user 401 has descended the stairs into a dark basement, and the IoT system activates the lamp 413 in response to a determination that the user 401 is present ($C_1$=TRUE). Consider now how the IoT system will behave if it acts in accordance with the method 500A depicted in FIG. 5. At 510, the IoT system would determine at 510 whether the user 401 is present. When the method 500A detects that the user 401 is present ($C_1$=TRUE), the IoT system would proceed to 550, where it would perform the function of activating the lamp 413. The image sensor 410 would then receive image data (at 560), and a gesture would be recognized in the image data (at 570). The recognized gesture would be interpreted as positive user feedback (at 580), and the IoT system would be reconfigured by increasing a confidence level associated with activation of the lamp 413 in response to a determination that the user 401 has entered the basement (for example, increasing the first confidence score $S_1$ as depicted at 612 in FIG. 6).

In the scenario depicted in FIG. 4B, the user 401 has entered a naturally-lit sunroom, and the IoT system activates the lamp 413 in response to a determination that the user 401 is present ($C_1$=TRUE). Consider now how the IoT system will behave if it acts in accordance with the method 500A depicted in FIG. 5. At 510, the IoT system would determine at 510 whether the user 401 is present. When the method 500A detects that the user 401 is present ($C_1$=TRUE), it would proceed to 550, where it would perform the function of activating the lamp 413. The image sensor 410 would then receive image data (at 560), and a gesture would be recognized in the image data (at 570). The recognized gesture would be interpreted as negative user feedback (at 580), and the IoT system would be reconfigured by decreasing a confidence level associated with activation of the lamp 413 in response to a determination that the user 401 has entered the sunroom (for example, decreasing the first confidence score $S_1$ as depicted at 614 in FIG. 6).

Consider now how the IoT system would behave if it performed the recognition algorithm depicted in FIG. 6. At 610, the IoT system would recognize a gesture of approval every time the user 401 entered the sunroom when it was dark and/or cloudy. Moreover, the IoT system would recognize a gesture of disapproval every time the user 401 entered the sunroom on a sunny day. If there was enough negative feedback over a given period of time, then the first correlation score $S_1$ would decrease. For example, if roughly half of the feedback were positive feedback, and the other half of the feedback were negative feedback, then $S_1$ would tend toward zero (indicating no correlation). At a certain point in its decline toward zero, $S_1$ may fall below a confidence threshold, for example, +0.4. As a result, the IoT system would commence the monitoring of the second condition $C_2$ at 660. The IoT system would abandon the method 500A in favor of the method 500B depicted in FIG. 7.

In the method 500B depicted in FIG. 7, the activation of the lamp 413 at 550 is still performed in response to a determination that $C_1$=TRUE. However, this approach has not led to consistent positive feedback, so $C_2$ is being monitored to determine if other approaches would be more successful.

Suppose that the second condition $C_2$ is a solar power level measured by the solar panel 411 as one example. Consider now how the IoT system would behave if it commenced monitoring of $C_2$ (as at 720) while performing the recognition algorithm depicted in FIG. 8. For clarity of illustration, the sun exposure levels in the present example are mapped to a simple TRUE/FALSE determination in the present example. In particular, if a solar power level is at 100 W or above, then $C_2$=TRUE, and if the solar power level is below 100 W, then $C_2$=FALSE.

At 810, the IoT system would recognize a gesture of approval when the user 401 entered the sunroom ($C_1$=TRUE) at night ($C_2$=FALSE). As a result, $S_1$ would be increased at 812, $S_2$ would be increased at 822, and $S_{combo2}$ would be increased at 830. However, some time later, the IoT system would recognize a gesture of disapproval when the user 401 entered the sunroom ($C_1$=TRUE) when it was sunny ($C_2$=TRUE). As a result, $S_1$ would be decreased at 812, $S_2$ would be increased at 822, and $S_{combo2}$ would be increased at 830. Over time, the first correlation score $S_1$ would steadily decrease toward zero, because the IoT system continues to receive mixed user feedback when $C_1$=TRUE. By contrast, $S_{combo2}$ will tend toward +1, indicating a strong likelihood of positive user feedback when ($C_1$=TRUE) AND ($C_2$=FALSE). Accordingly, at some point, the value of $S_{combo2}$ may exceed the value of $S_1$. In response to the determination at 850 that $S_{combo2}$ exceeds the value of $S_1$, the recognition algorithm proceeds to 860. At 860, the IoT system is reconfigured yet again, so as to behave in accordance with the method 500C.

Because $S_{combo2}$ has proven to be the best predictor of positive user feedback (by virtue of its value being nearest to +1), the triggering condition used in the method 500C is reconfigured so as to adopt as the triggering condition the combination of conditions associated with $S_{combo2}$. In particular, the method 500C proceeds to activate the lamp 413 only if $C_1$ is TRUE (user 401 present) and $C_2$ is FALSE (solar power level is below 100 W).

By reconfiguring the IoT system in response to feedback provided by the user, the IoT system proceeded from the method 500A depicted in FIG. 5 to the method 500B depicted in FIG. 7, where it was trying to identify new and better methods. After some data-gathering, the IoT system proceeded from the method 500B to the method 500C depicted in FIG. 9, where better methods were put into practice. Unless the user's preferences change (or new relevant condition-measurement techniques are added to the IoT system), the IoT system will continue to perform the method 500C. While the reconfiguring of the IoT system has been illustrated with reference to FIGS. 5-9, it is understood that other methods of incorporating user feedback can be used, including various machine learning approaches. The various approaches allow the IoT system to respond, over time, to positive and negative user feedback to allow IoT system to better control various devices and appliances in accordance with user preferences. While FIGS. 4A and 4B, and subsequent discussions with reference to FIGS. 5-9, were discussed in the context of an IoT system for activating a lamp, it is understood that an IoT system could use positive and negative user feedback in other contexts, including automatic faucets, automatic toilets, automatic soap dispensers, as well as the various devices referred to in FIG. 1 such as thermostat 114 for regulating room temperature, refrigerator 116, and washer and dryer 118, to name some non-limiting examples. Also, while the disclosure herein has been with reference to an IoT system, a smart sensor system that includes a vision sensor (such as always-on vision sensor 210 of FIG. 2A) capable of controlling a lamp or an HVAC system, or other kind of device, appliance, or system, may be reconfigured based on user feedback in the manner described above even it is not addressable via the internet and hence not, strictly speaking, an IoT device. While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

Various aspects are disclosed in the following description and related drawings to show specific examples relating to exemplary aspects of an IoT system. Alternate aspects will be apparent to those skilled in the pertinent art upon reading this disclosure, and may be constructed and practiced without departing from the scope or spirit of the disclosure. Additionally, well-known elements will not be described in detail or may be omitted so as to not obscure the relevant details of the aspects disclosed herein.

The word "exemplary" is used herein to mean "serving as an example, instance, or illustration." Any aspect described herein as "exemplary" is not necessarily to be construed as preferred or advantageous over other aspects. Likewise, the term "aspects" does not require that all aspects include the discussed feature, advantage or mode of operation.

The terminology used herein describes particular aspects only and should not be construed to limit any aspects disclosed herein. As used herein, the singular forms "a," "an," and "the" are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof. Similarly, the phrase "based on" as used herein does not necessarily preclude influence of other factors and should be interpreted in all cases as "based at least in part on" rather than, for example, "based solely on" or "based only on".

Further, many aspects are described in terms of sequences of actions to be performed by, for example, elements of a computing device. It will be recognized that various actions described herein can be performed by specific circuits (for example, one or more general-purpose processors, a digital signal processor (DSP), an application specific integrated circuit (ASIC), a field programmable gate array (FPGA) or other programmable logic device, discrete gate or transistor logic, discrete hardware components, or any combination thereof). It will be further recognized that the various actions described herein can be performed by executing program instructions. Additionally, the sequence of actions described herein can be considered to be embodied entirely within a memory system comprising any form of computer-readable storage medium (for example, RAM, flash memory, ROM, EPROM, EEPROM, registers, hard disk, a removable disk, a CD-ROM, or any other form of storage medium known in the art). The memory system may store and/or provide code for causing a processing system to perform the corresponding functionality described herein. Accordingly, those skilled in the art will appreciate that the various illustrative logical blocks, modules, circuits, and algorithms described in connection with the aspects disclosed herein may be implemented as electronic hardware, computer software, or combinations of both. Whether such functionality is implemented as hardware or software or both depends upon the particular application and design constraints imposed on the overall system.

What is claimed is:

1. A method of learning performed in an Internet of Things (IoT) system, comprising:
    determining whether a first condition holds, the first condition being a contextual condition sensed by a first IoT sensor of the IoT system, wherein the contextual condition comprises a characteristic of an environment in which the IoT system is situated or a detected change occurring within the environment;
    performing a function of the IoT system in response to a trigger, wherein the trigger is a determination that the first condition holds;
    recognizing a gesture based on image data received from an image sensor, the gesture indicating user feedback in response to the performance of the function, the gesture including a gesture of approval or a gesture of disapproval, wherein recognizing a gesture further includes recognizing a set of gestures, the set of gestures corresponding to different respective instances of the performing of the function of the IoT system;
    based on the recognized gesture, reconfiguring the IoT system for a future performance of the function, the future performance of the function in response to the trigger, wherein the reconfiguring includes interpreting the recognized gesture as being either:
        a positive feedback gesture associated with the gesture of approval, wherein positive user feedback data is generated based on the positive feedback gesture, or
        a negative feedback gesture associated with the gesture of disapproval, wherein negative user feedback data is generated based on the negative feedback gesture;
    determining whether a second condition holds, the second condition being another contextual condition sensed by a second IoT sensor of the IoT system, different from the first condition; and
    determining that the set of gestures is a mixed set of gestures including one or more gestures that are associated with positive user feedback data and one or more gestures that are associated with negative feedback gestures, wherein the determining of whether the second condition holds is responsive to the determination that the set of gestures is a mixed set of gestures.

2. The method of claim 1, wherein the reconfiguring includes adjusting a first correlation score that indicates a correlation between the first condition and the future performance of the function.

3. The method of claim 2, wherein the adjusting of the first correlation score comprises:
    increasing the first correlation score in response to a determination that the recognized gesture is a positive feedback gesture; and
    decreasing the first correlation score in response to a determination that the recognized gesture is a negative feedback gesture.

4. The method of claim 2, wherein the reconfiguring further comprises one or both of:
    adjusting a second correlation score that indicates a correlation between the future performance of the function and the second condition; or
    adjusting a combination correlation score that indicates a correlation between the future performance of the function and a combination of the first condition and the second condition.

5. The method of claim 4, wherein the reconfiguring further comprises:
comparing the first correlation score to the second correlation score and/or the combination correlation score;
determining that the second correlation score and/or the combination correlation score exceeds the first correlation score; and
in response to the determining, reconfiguring the trigger for performing a function of the IoT system such that the trigger is:
a determination that the second condition holds; or
a determination that both the first condition and the second condition hold.

6. The method of claim 1, wherein:
the determining of whether the first condition holds is based on first condition data collected using the first sensor associated with the IoT system; and
the determining of whether the second condition holds is based on second condition data collected using the second sensor associated with the IoT system.

7. The method of claim 1, further comprising:
performing the function of the IoT system a second time in accordance with the reconfiguring of the IoT system.

8. An Internet of Things (IoT) system, the IoT system comprising:
a memory system configured to store data and/or instructions; and
a processing system coupled to the memory system, the processing system being configured to:
determine whether a first condition holds, the first condition being a contextual condition sensed by a first IoT sensor of the IoT system, wherein the contextual condition comprises a characteristic of an environment in which the IoT system is situated or a detected change occurring within the environment;
perform a function of the IoT system in response to a trigger, wherein the trigger is a determination that the first condition holds;
recognize a gesture based on image data received from an image sensor, the gesture indicating user feedback in response to the performance of the function, the gesture including a gesture of approval or a gesture of disapproval, wherein recognizing a gesture includes recognizing a set of gestures, the set of gestures corresponding to different respective instances of the performing of the function of the IoT system; and
based on the recognized gesture, reconfigure the IoT system for a future performance of the function, the future performance of the function in response to the trigger, wherein reconfiguring the IoT system includes interpreting the recognized gesture as being either:
a positive feedback gesture associated with the gesture of approval, wherein positive user feedback data is generated based on the positive feedback gesture, or
a negative feedback gesture associated with the gesture of disapproval, wherein negative user feedback data is generated based on the negative feedback gesture;
determine whether a second condition holds, the second condition being another contextual condition sensed by a second IoT sensor of the IoT system, different from the first condition; and
determine that the set of gestures is a mixed set of gestures including one or more gestures that are associated with positive user feedback data and one or more gestures that are associated with negative feedback gestures, wherein determining whether the second condition holds is responsive to the determination that the set of gestures is a mixed set of gestures.

9. The IoT system of claim 8, wherein to reconfigure the IoT system, the processing system is further configured to:
adjust a first correlation score that indicates a correlation between the first condition and the future performance of the function.

10. The IoT system of claim 9, wherein to adjust the first correlation score, the processing system is further configured to:
increase the first correlation score in response to a determination that the recognized gesture is a positive feedback gesture; and
decrease the first correlation score in response to a determination that the recognized gesture is a negative feedback gesture.

11. The IoT system of claim 9, wherein to reconfigure the IoT system, the processing system is further configured to:
adjust a second correlation score that indicates a correlation between the future performance of the function and the second condition; and
adjust a combination correlation score that indicates a correlation between the future performance of the function and a combination of the first condition and the second condition.

12. The IoT system of claim 11, wherein to reconfigure the IoT system, the processing system is further configured to:
compare the first correlation score to the second correlation score and/or the combination correlation score;
determine that the second correlation score and/or the combination correlation score exceeds the first correlation score; and
in response to the determination that the second correlation score and/or the combination correlation score exceeds the first correlation score, reconfigure the trigger for performing a function of the IoT system such that the trigger is:
a determination that the second condition holds; or
a determination that both the first condition and the second condition hold.

13. The IoT system of claim 8, wherein:
the first sensor of the IoT system is configured to collect first condition data; and
the second sensor of the IoT system is configured to collect second condition data;
wherein the processing system is further configured to:
determine whether the first condition holds based on the first condition data; and
determine whether the second condition holds based on the second condition data.

14. The IoT system of claim 8, wherein the processing system is further configured to perform the function of the IoT system a second time in accordance with the reconfiguring of the IoT system.

15. An Internet of Things (IoT) system, the IoT system comprising:
means for determining whether a first condition holds, the first condition being a contextual condition sensed by a first IoT sensor of the IoT system, wherein the contextual condition comprises a characteristic of an environment in which the IoT system is situated or a detected change occurring within the environment;
means for performing a function of the IoT system in response to a trigger, wherein the trigger is a determination that the first condition holds;

means for recognizing a gesture based on image data received from an image sensor, the gesture indicating user feedback in response to the performance of the function, the gesture including a gesture of approval or a gesture of disapproval, wherein the means for recognizing a gesture includes means for recognizing a set of gestures, the set of gestures corresponding to different respective instances of the performing of the function of the IoT system;

means for, based on the recognized gesture, reconfiguring the IoT system for a future performance of the function, the future performance of the function in response to the trigger, the means for reconfiguring the IoT system including:
  means for interpreting the gesture as a positive feedback gesture associated with the gesture of approval, wherein positive user feedback data is generated based on the positive feedback gesture, and
  means for interpreting the gesture as a negative feedback gesture associated with the gesture of disapproval, wherein negative user feedback data is generated based on the negative feedback gesture;

means for determining whether a second condition holds, the second condition being another contextual condition sensed by a second IoT sensor of the IoT system, different from the first condition; and means for determining that the set of gestures is a mixed set of gestures including one or more gestures that are associated with positive user feedback data and one or more gestures that are associated with negative feedback gestures, wherein the determining of whether the second condition holds is responsive to the determination that the set of gestures is a mixed set of gestures.

16. The IoT system of claim 15, wherein the means for reconfiguring comprises means for adjusting a first correlation score that indicates a correlation between the first condition and the future performance of the function.

17. The IoT system of claim 15, wherein the means for performing the function of the IoT system comprises:
  means for performing the function of the IoT system a second time in accordance with the reconfiguring of the IoT system.

18. A non-transitory computer-readable medium comprising code, which, when executed by a processor, causes the processor to perform operations in an Internet of Things (IoT) system, the non-transitory computer-readable medium comprising:
  code for determining whether a first condition holds, the first condition being a contextual condition sensed by a first IoT sensor of the IoT system, wherein the contextual condition comprises a characteristic of an environment in which the IoT system is situated or a detected change occurring within the environment;
  code for performing a function of the IoT system in response to a trigger, wherein the trigger is a determination that the first condition holds;
  code for recognizing a gesture based on image data received from an image sensor, the gesture indicating user feedback in response to the performance of the function, the gesture including a gesture of approval or a gesture of disapproval, wherein the code for recognizing a gesture includes code for recognizing a set of gestures, the set of gestures corresponding to different respective instances of the performing of the function of the IoT system;
  code for, based on the recognized gesture, reconfiguring the IoT system for a future performance of the function, the future performance of the function in response to the trigger, the code for reconfiguring the IoT system including:
    code for interpreting the gesture as a positive feedback gesture associated with the gesture of approval, wherein positive user feedback data is generated based on the positive feedback gesture, and
    code for interpreting the gesture as a negative feedback gesture associated with the gesture of disapproval, wherein negative user feedback data is generated based on the negative feedback gesture;
  code for determining whether a second condition holds, the second condition being another contextual condition sensed by a second IoT sensor of the IoT system, different from the first condition; and
  code for determining that the set of gestures is a mixed set of gestures including one or more gestures that are associated with positive user feedback data and one or more gestures that are associated with negative feedback gestures, wherein the determining of whether the second condition holds is responsive to the determination that the set of gestures is a mixed set of gestures.

19. The non-transitory computer-readable medium of claim 18, wherein the code for reconfiguring comprises code for adjusting a first correlation score that indicates a correlation between the first condition and the future performance of the function.

20. The non-transitory computer-readable medium of claim 18, wherein the code for performing the function of the IoT system comprises:
  code for performing the function of the IoT system a second time in accordance with the reconfiguring of the IoT system.

* * * * *